United States Patent
Momona

Patent Number: 5,815,660
Date of Patent: Sep. 29, 1998

[54] MASTER STATION STOPS POLLING A SLAVE STATION IF DETECTING NO COMMUNICATION OR RECEIVING A STOP POLLING REQUEST FROM THE SLAVE STATION

[75] Inventor: Morihisa Momona, Tokyo, Japan

[73] Assignee: NEC Corporation, Tokyo, Japan

[21] Appl. No.: 644,517

[22] Filed: May 10, 1996

[30] Foreign Application Priority Data

May 11, 1995 [JP] Japan ................................. 7-112836

[51] Int. Cl.[6] ........................................ G06F 13/00
[52] U.S. Cl. .................... 395/200.38; 395/200.62; 395/200.67; 395/200.78; 395/200.83
[58] Field of Search .................... 370/449, 443, 370/453, 348; 340/825.08; 395/200.38, 200.62, 200.67, 200.78, 200.83

[56] References Cited

U.S. PATENT DOCUMENTS

| | | |
|---|---|---|
| 4,167,730 | 9/1979 | Brown ................................. 340/825.08 |
| 4,924,461 | 5/1990 | Amemiya et al. ....................... 370/449 |
| 4,937,818 | 6/1990 | Sonetaka ................................. 370/348 |
| 5,088,094 | 2/1992 | Grauel et al. ............................ 370/443 |
| 5,132,680 | 7/1992 | Tezuka et al. ....................... 340/825.08 |
| 5,166,675 | 11/1992 | Amemiya et al. ................... 340/825.08 |
| 5,361,260 | 11/1994 | Mito ......................................... 370/452 |

Primary Examiner—Frank J. Asta
Assistant Examiner—Le Hien Luu
Attorney, Agent, or Firm—Ostrolenk, Faber, Gerb & Soffen, LLP

[57] ABSTRACT

Monitoring a slave station's communication, a master station stops polling if no communication. To resume polling, the master station transmits subscription polling in a certain rate to inquiry in a broadcasting type necessity of polling. A slave station that is going to resume polling responds this and comprises means to re-transmit in random if a response of the slave station conflicts other slave station's response. In addition, the master station comprises means to monitor response conflict conditions and dynamically control the number of times of subscription polling.

20 Claims, 22 Drawing Sheets

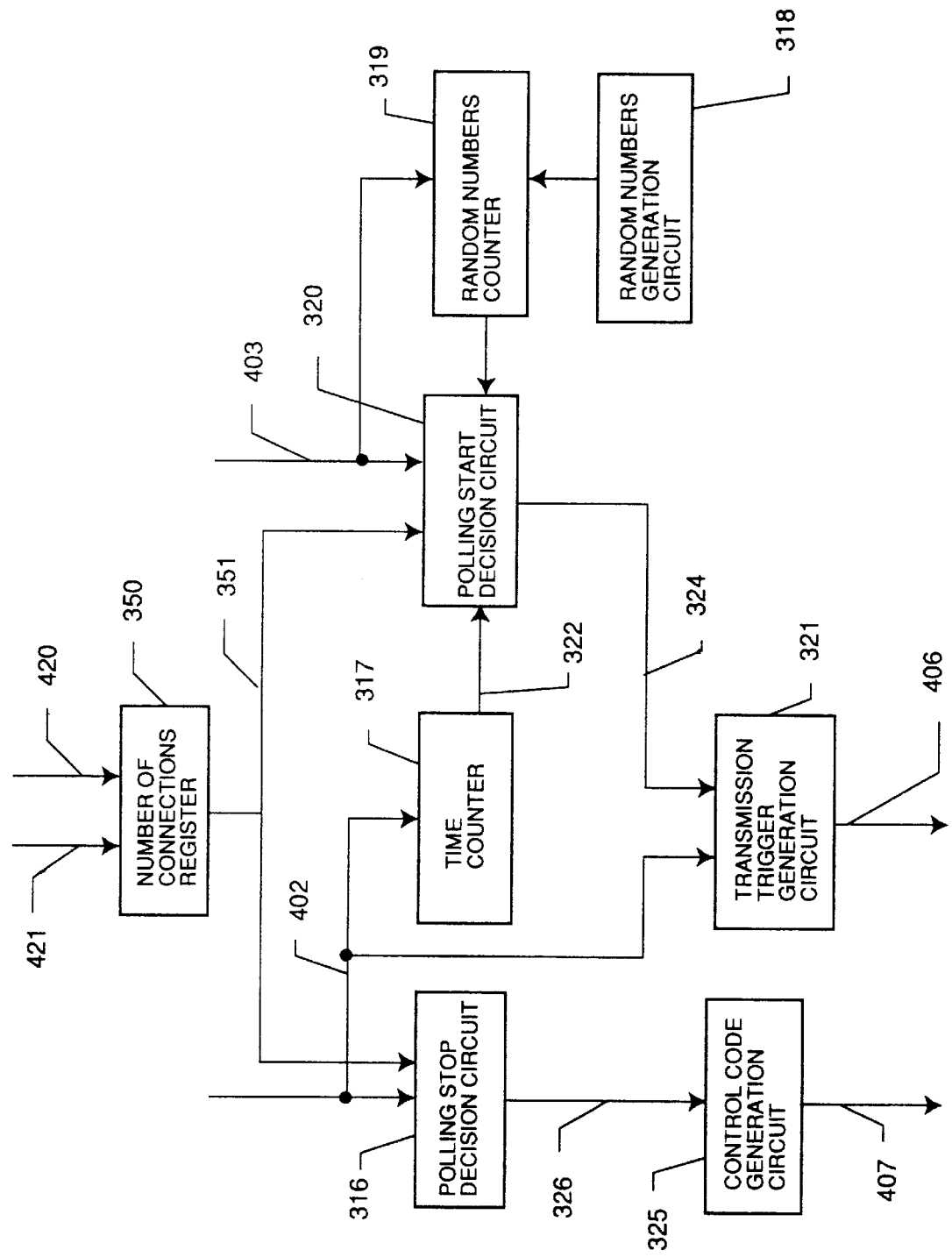

MASTER STATION STOPS POLLING A SLAVE STATION IF DETECTING NO COMMUNICATION OR RECEIVING A STOP POLLING REQUEST FROM THE SLAVE STATION

BACKGROUND OF THE INVENTION

This invention relates to a multiple access communication system for communication between a master station and a slave station and, more particularly, to the one for accommodating a plurality of slave stations.

A media sharing network system such as LAN (Local Area Network), satellite communication system, cable TV or the like allows a master station to communicate with a plurality of slave stations bilaterally. The master station broadcasts signals to all slave stations simultaneously via broadcasting channel. While the communication from the slave station to the master station is done via multiple access channel time divided among those slave stations. A polling system has been used as one of methods for competition controlling slave stations on the multiple access channel.

In the polling method, a master station transmits a control signal called a "polling" signal to each slave station via the broadcast channel. The polling signal contains information indicating address of the addressed slave station and channel allocation amount. Upon receiving the polling signal addressed thereto, each slave station transmits data of channel allocation amount and data of channel allocation amount required for the next communication to the master station. Based on the required channel allocation amount, the master station determines the next channel allocation amount. As aforementioned, the polling method allows for dynamic controlling of the channel allocation and efficient use of the channel.

It has been possible for a conventional method to use the channel efficiently in the case where each slave station transmits data on a regular basis. As the slave stations are increasingly used, however, the slave stations transmitting no data are also increasing. Accordingly the polling signals will be sent to those unrelated slave stations, thus deteriorating efficient use of the channel. The slave station having transmission data has to be kept waiting until it receives the polling signal. This may cause the slave station having such data to delay its transmission.

SUMMARY OF THE INVENTION

It is an object of the present invention to solve the aforementioned problem. It is another object of the present invention to provide an art for improving efficient use of the channel by controlling the polling signal so as to be transmitted only to the related slave station.

In the present invention, the polling signal is prevented to be transmitted to the incommunicable slave station based on a judgement made by the master station or the slave station. When the slave station starts communicating, the polling signal is transmitted thereto again, resulting in efficient transmission of the polling signal.

More specifically, in case where the master station is provided with a means to stop sending the polling signal to any of the slave stations receives the signal from the slave station requiring to stop transmitting the polling signal or the master station judges that the slave station is not communicating, the master station stops polling. The slave station is provided with a means for sending a signal requiring the master staion to stop polling. When the slave station stops communicating, the master station is controlled to stop polling. The master station is provided with a means for transmitting an entry polling for inquiring if the master station is allowed to start polling to the slave station. The entry polling signal is transmitted to all the slave stations on the regular basis. The slave station is provided with a means for transmitting a signal requiring the master station to start polling. The slave station which has not received polling and is expected to start sending data transmits the signal requiring to start polling to the entry polling. The master station is provided with a means for starting polling. In case one slave station transmits the signal requiring to start polling to the entry polling, it starts polling. When a plurality of slave stations respond to the entry polling simultaneously, the signals may conflict. To avoid the conflict, the slave station is provided with a means for generating random number. In case the signal conflict prevents the polling from starting, the slave station is controlled to respond the entry polling at intervals equivalent to the generated random number. As a result, the signal conflict can be prevented. If the signal conflict occurs again, retransmission will be executed based on the random number. Each of the above means coworks to stop or start polling to each slave station dynamically, resulting in reducing the polling signals sent to unrelated slave stations.

In case of connectionless data communication, the master station is provided with a means for monitoring the channel amount required by the slave station in the past according to the polling and a means for stopping polling to the slave station which has been keeping its required channel amount "0" for a predetermined time length.

In case of connection data communication, the slave station is provided with a means for monitoring the number of connection which has been always used and the master station is provided with a means for transmitting a signal requiring to stop polling in case the number of connection becomes 0.

In addition, the multiple access system of the present invention, wherein the subscription polling control means comprises: means for measuring the probability of success representing that polling resume request transmitted from a slave station responding to the subscription polling is normally received; means for measuring the probability of conflict representing that a plurality of polling resume requests transmitted from slave stations for the subscription polling conflict each other; means for calculating a traffic amount by adding the probability of success to doubled the probability of conflict; means for reducing average number of the subscription polling when the probability of success is not more than a first threshold value and the traffic amount is not more than a second threshold value; and means for increasing average number of the subscription polling when the probability of success is not more than the first threshold value and the traffic amount is not less than a third threshold value.

As a result, the success of requirement to start the entry polling has been kept the highest rate, reducing unnecessary entry polling.

BRIEF DESCRIPTION OF THE DRAWINGS

This and other objects, features and advantages of the present invention will become more apparent upon a reading of the following detailed description and drawings, in which:

FIG. 22 is a block diagram showing details of the response control circuit of the slave station of the second embodiment of the present invention.

DESCRIPTION OF THE PREFERRED EMBODIMENTS

First detailed explanations common to a first embodiment and a second embodiment below are described.

Figure 1:
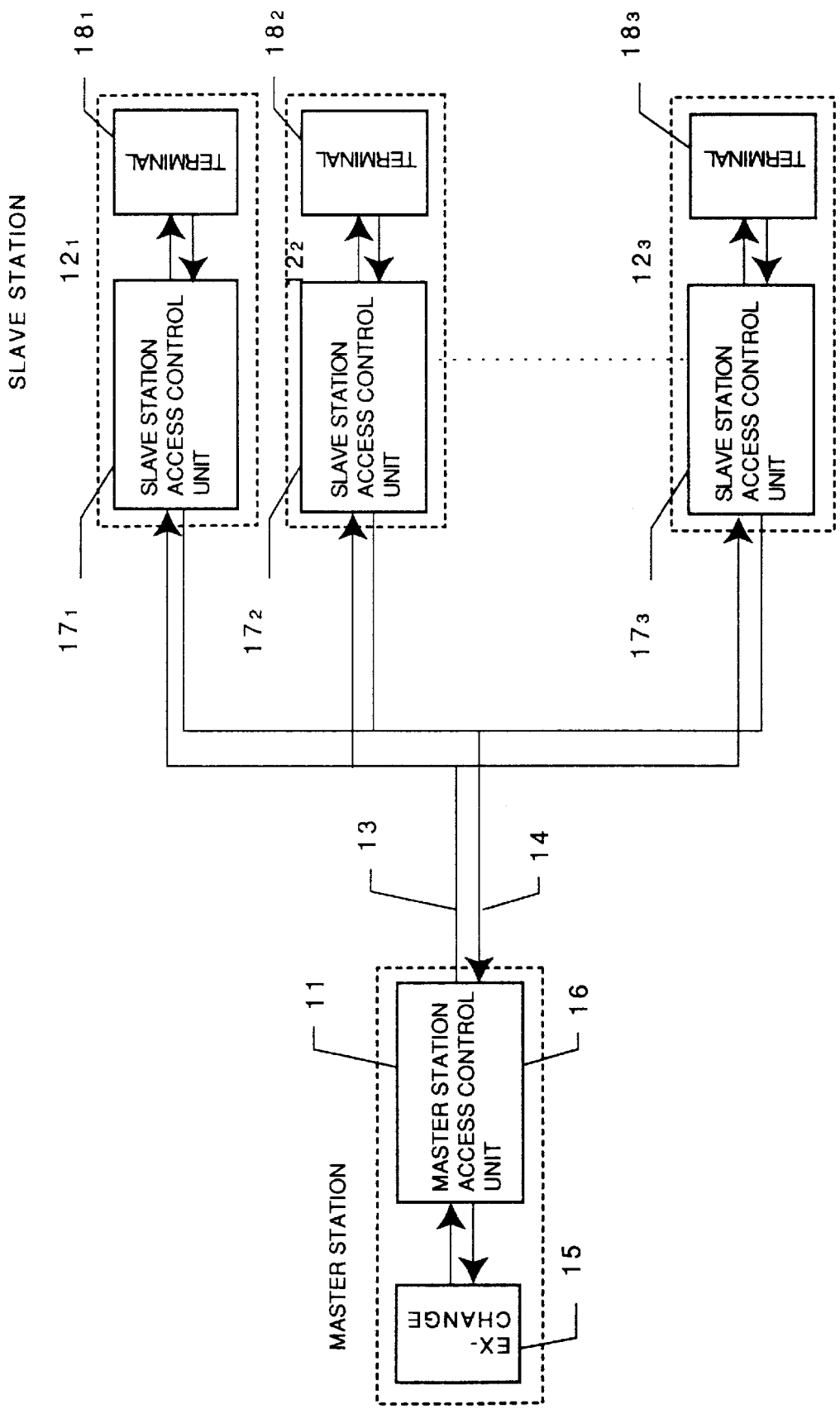
FIG. 1 is a block diagram of the configuration of the multiple access communication system of a first embodiment and a second embodiment of the present invention.

FIG. 1 is a schematic view showing a construction of the system which works based on the multiple access communication method The system comprises an exchange 15, an access control unit for master station 16, a plurality of access control units for slave station 171-3 and a plurality of terminals 181-3. Although this embodiment uses 3 slave stations, the number of those slave stations is not restricted but set to any desired number. A signal transmitted from a master station 11 is broadcasted to all the slave stations 121-3 via broadcasting type channel 13. The signal transmitted from each slave station is multiplexed on a timing axis and transferred to the master station.

Figure 2:
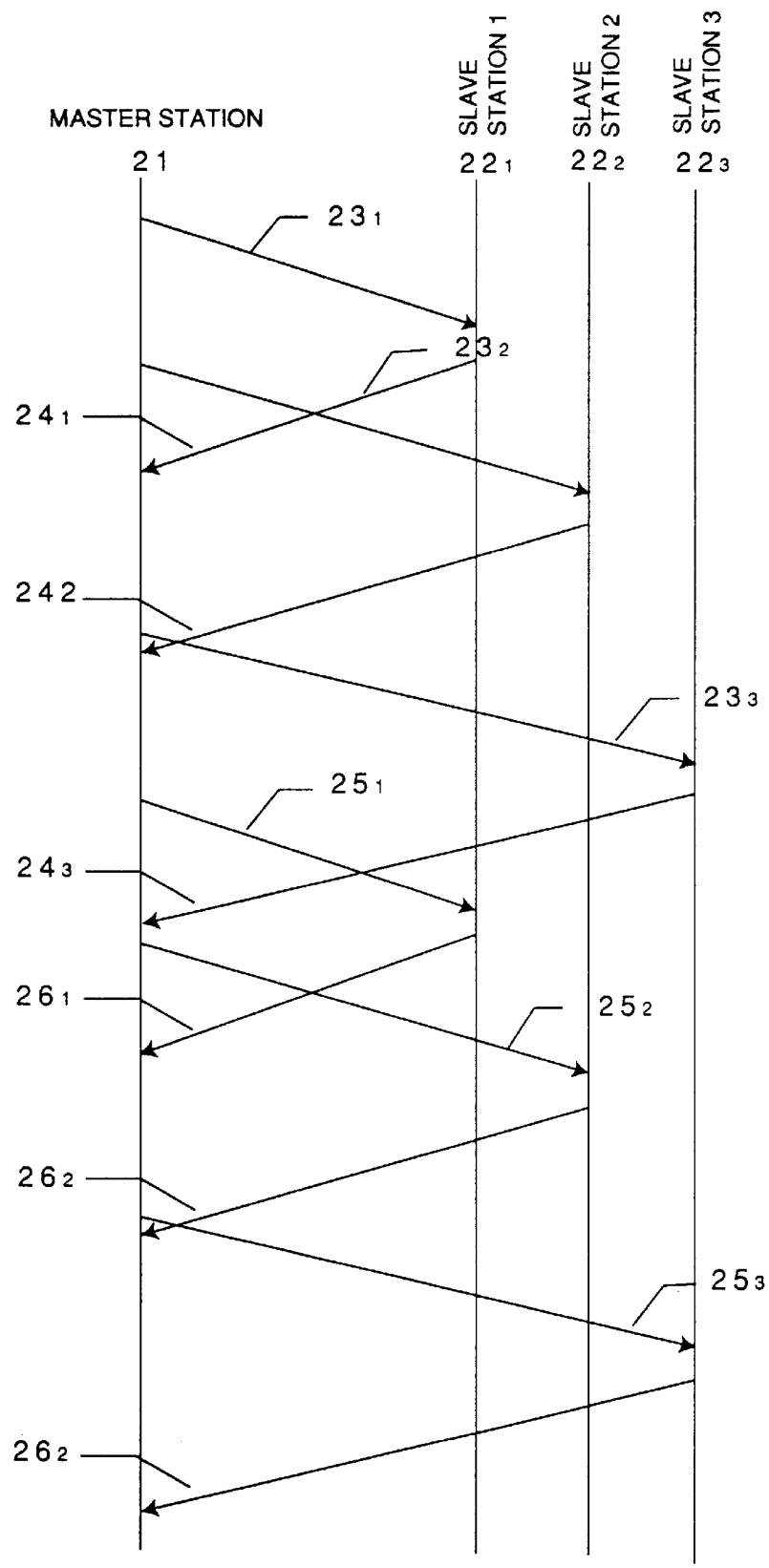
FIG. 2 is a block diagram representing a normal communication sequence of the multiple access communication system of the first embodiment and the second embodiment of the present invention.

FIG. 2 shows an algorithm for the data transfer between the master station 21 and the slave stations 221-3. The master station 21 transmits a signal called "polling" via the broadcast channel. The polling signal contains information indicating the address of the addressed slave station and channel allocation amount of the slave station. All the slave stations receive the polling signal. The slave station with its address conforming to that contained in the polling signal is allowed to transmit the data equivalent to the channel allocation amount. This slave station also transmits the information of the required channel amount for the next allocation. After transmitting a polling signal, the master station transmits the data equivalent to the channel allocated amount which has been allocated to the slave station. Then the master station transmits the next polling signal. The master station repeats the same processes until all the slave stations receive the polling signal. FIG. 2 shows that the polling signal 231-3 is transmitted to the slave station 1, slave station 2 and slave station 3. Each of the slave stations 1, 2 and 3 sends band width information for data and request 241-3 to the master station. Completing the polling to all the slave stations, the master station transmits a polling signal to the first slave station, i.e., polling signal 251-3 again. The channel allocated amount is determined based on the channel required amount of the last allocation.

Figure 3:
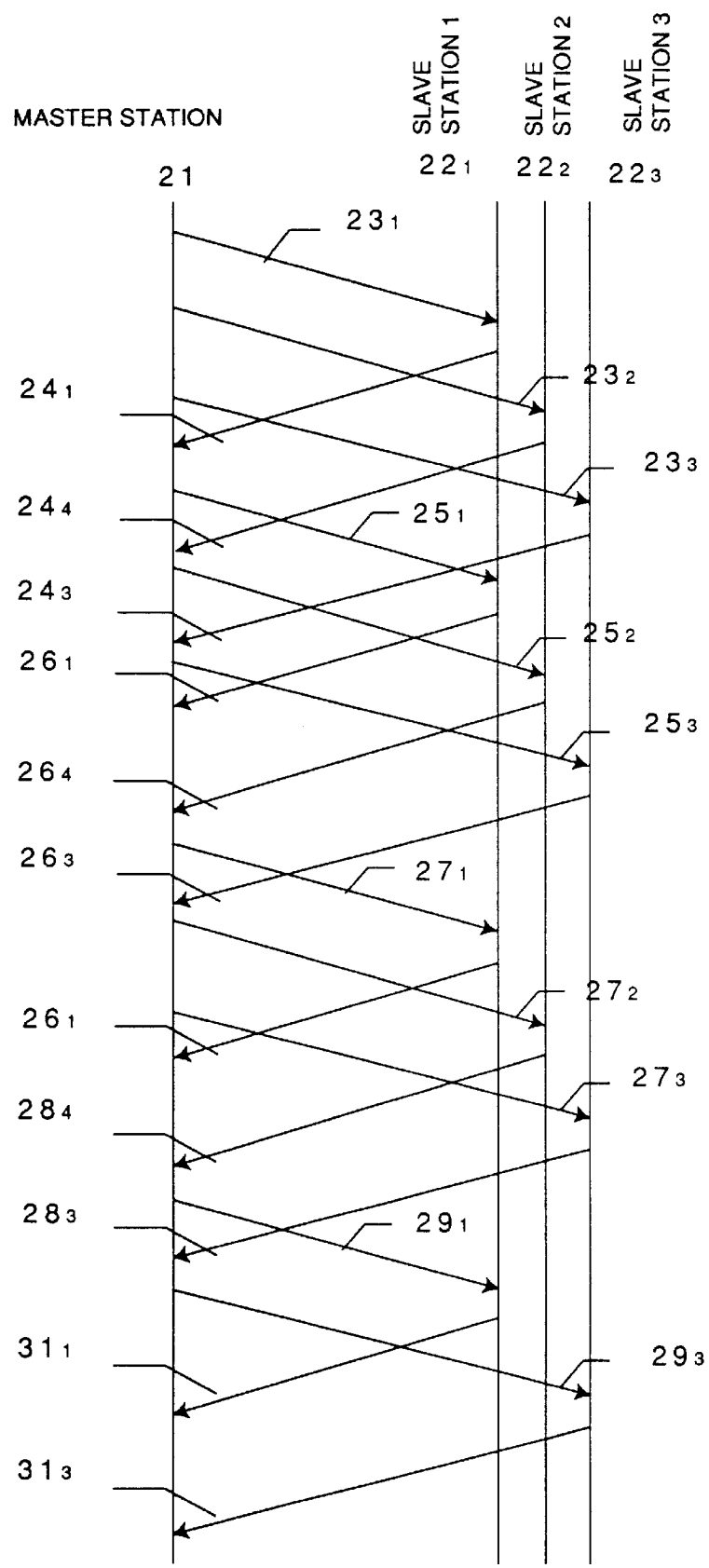
FIG. 3 is a figure for representing the sequence of the master station to stop polling in the multiple access communication system of the first embodiment of the present invention.

FIG. 3 shows an algorithm for stopping polling according to the master station's judgement. The master station inspects the channel required amount of each slave station. The master station stops polling to the slave station which has sent the requirements less than a predetermined times. In FIG. 3, the slave station 2 sends 244, 264 and 284 3 times successively, all of which indicate the channel required amount of 0. As a result, the master station stops polling to the slave station 2. The number of sending the response signals indicating no requirement is not restricted to "3" but set to any desired number.

Figure 4:
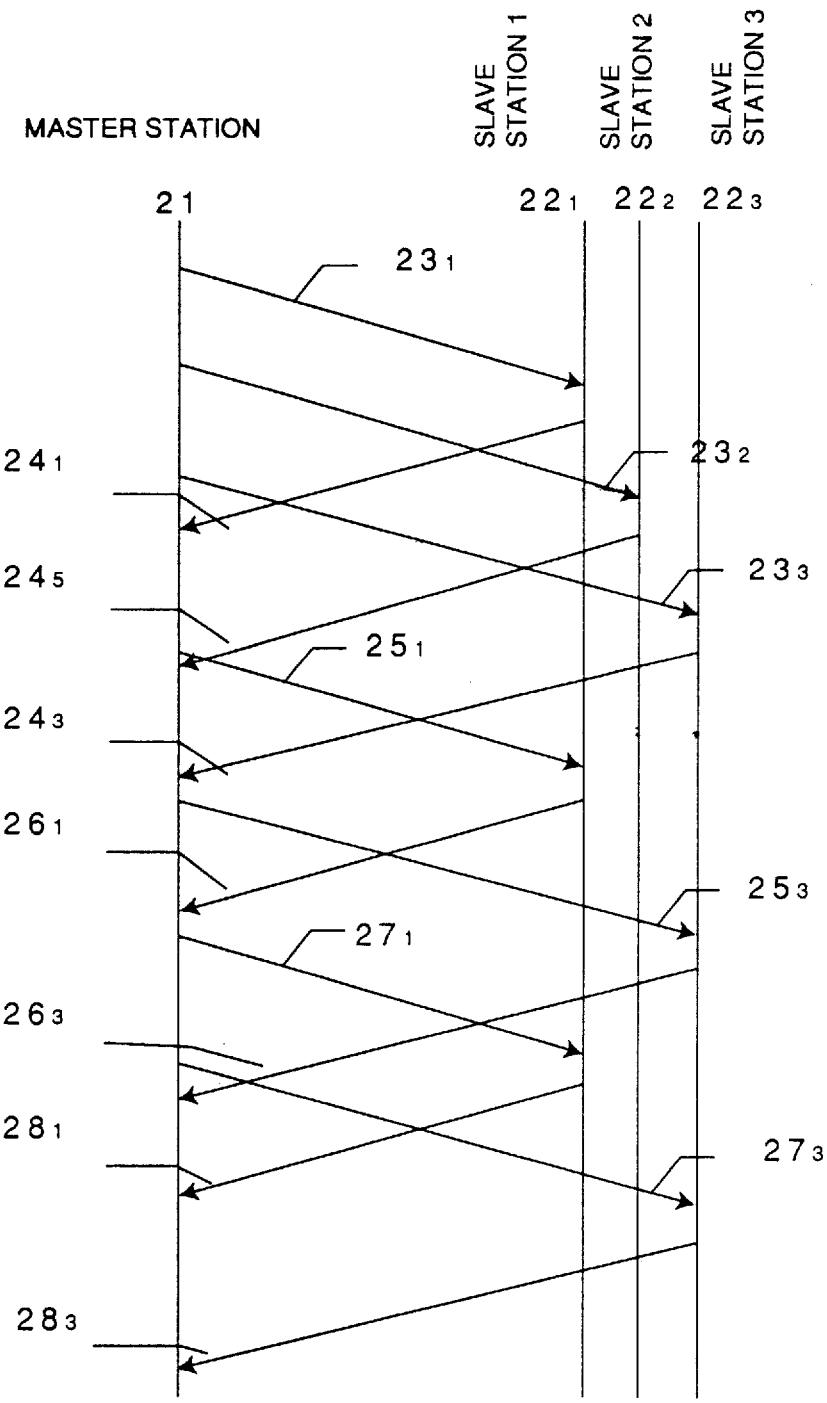
FIG. 4 is a figure for representing the sequence for stopping polling upon the request from the slave station in the multiple access communication system of the first embodiment and the second embodiment of the present invention.

FIG. 4 shows an algorithm for stopping polling according to the slave station's requirement. When detecting a certain state such as a halt of the terminal, the slave station transmits the signal requiring to stop polling together with the data to the polling signal from the master station. Upon receiving the signal requiring to stop polling from the slave station, the master station stops polling to the slave station. In FIG. 4, the slave station 2 transmits the polling stop request 245 to the master station. The master station then stops polling to the slave station 2.

Figure 5:
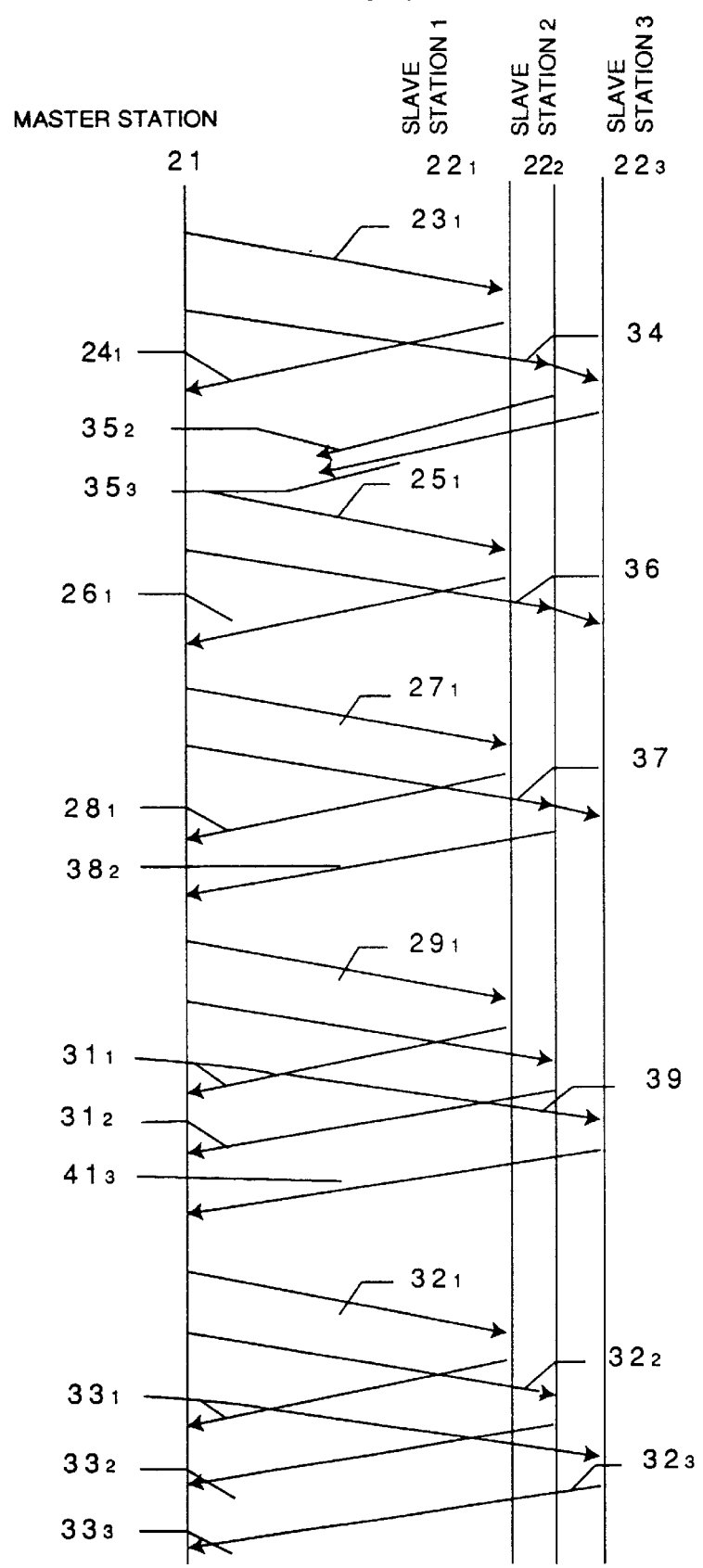
FIG. 5 is a figure for representing the sequence for starting polling in the multiple access communication system of the first embodiment and the second embodiment of the present invention.

FIG. 5 shows an algorithm for starting polling. Transmitting normal polling signals predetermined times, the master station transmits an subscription polling signal in order to make sure the polling can be started again. The subscription polling signal with its address not designated for the specific slave station but for all the slave stations. This address is called as a "broadcast address". Receiving the subscription polling signal, the slave station to which the polling signal is not transmitted sends a polling start request signal to the master station. As a plurality of slave stations respond to the subscription polling simultaneously, the respective polling start request signals may conflict one another. In the above case, the slave station is controlled to be retarded to respond to the subscription polling at intervals equivalent to the random number generated thereby. As a result, the successive signal conflict can be prevented. When receiving the polling start request signal from the slave station correctly, the master station starts polling to the slave station. In FIG. 5, the slave station 2 and slave station 3 have not received polling signals. They transmit polling start requests 351 and 352 simultaneously to the subscription polling 34, resulting in signal conflict. The slave stations 2 and slave stations 3 generate random numbers 2 and 3, respectively. Then the slave station 2 transmits a polling start request 382 not to the succeeding subscription polling 36 but to the second subscription polling signal 37. Receiving the polling start request, the master station starts poling to the slave station 2. The slave station 3 similarly transmits a polling start request 413 to the third subscription polling 39 after skipping two subscription polling signals. Then the polling is finally started.

Figure 6:
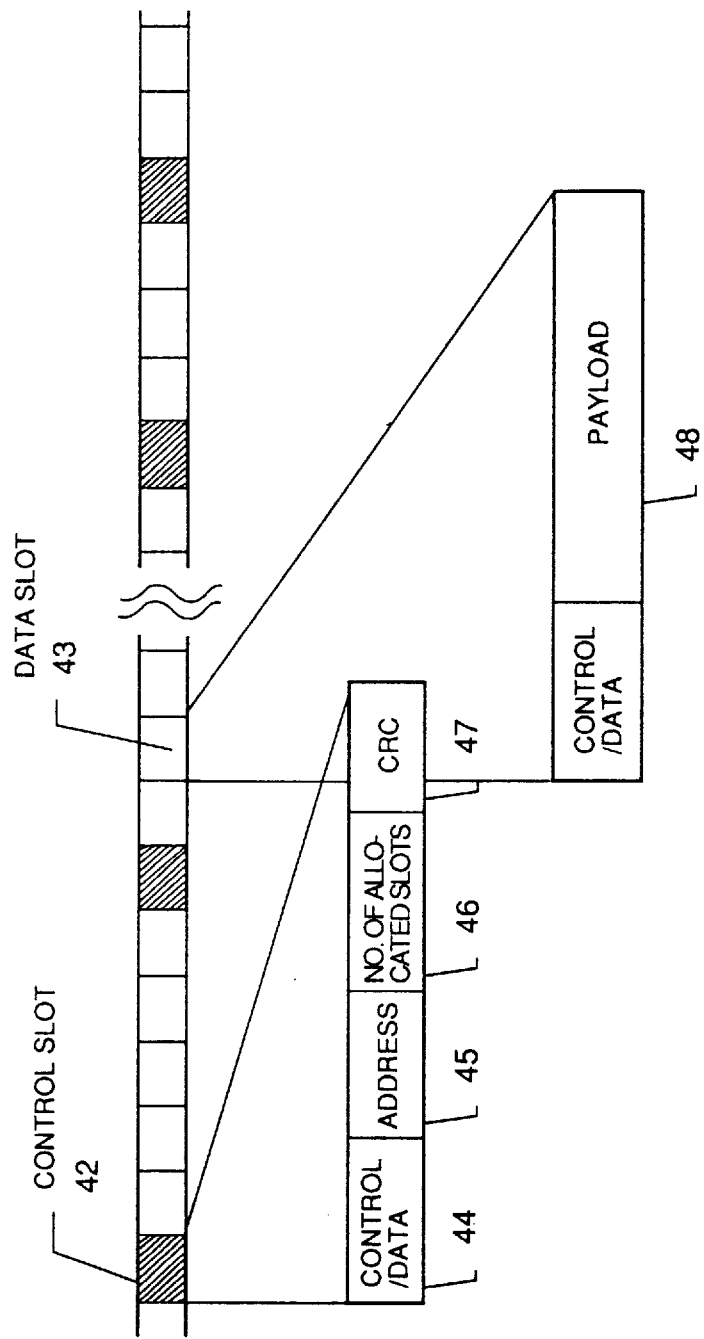
FIG. 6 is a figure for representing a format of the signal transmitted from the master station to the slave station via a broadcasting type channel in the multiple access communication system of the first embodiment and the second embodiment of the present invention.

FIG. 6 shows a format of the signal transmitted from the master station 11 to all the slave stations 121-3 via a broadcasting type channel 13. A slot with fixed length is repeatedly transmitted from the master station to the salve station. The slash mark represents the slot for sending protocol control information of the polling. This slot is hereinafter called as a control slot 42. The rest of the slots are used for data transfer, which are called as "data slot" 43. Constructions of the control slot 42 and the data slot 43 are explained. Control/data information 44 are attached to the head of the control slot 42 and the data slot 43, respectively to identify the slot type. The other part of the control slot is formed of an address 45 for designating the addressed slave station, number of allocated slot 46 and an error de tection code 47 for detecting an error in the address and allocated slot number. As the error detection code, the cyclic redundancy check (CRC) is used. The other part of the data slot is used as the payload 48.

Figure 7:
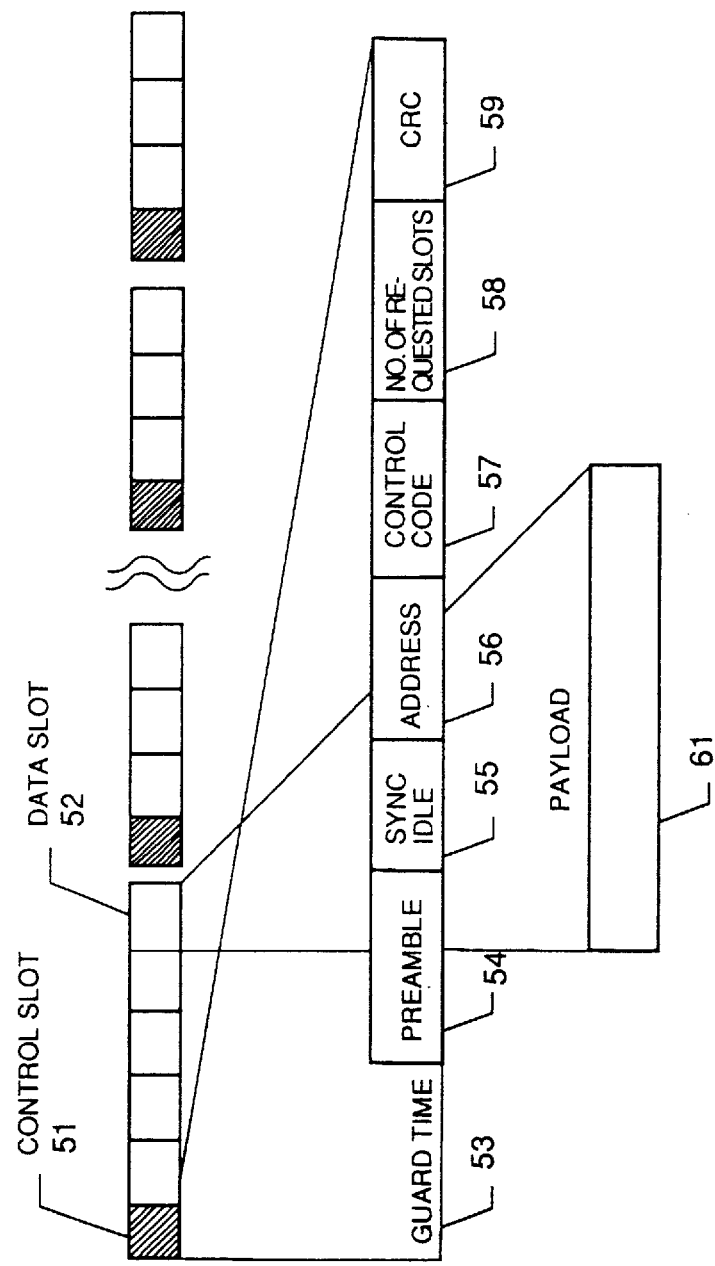
FIG. 7 is a figure for representing a format of the signal transmitted from the slave station to the master station via a multiple access type channel in the multiple access communication system of the first embodiment and the second embodiment of the present invention.

FIG. 7 shows a format of a signal transmitted from the slave stations 121-3 to the master station 11 via the multiple access type channel 14. This signal is obtained from time division multiplexing the burst signal intermittently sent from the first to the third slave stations. The burst signal sent from each slave station is formed of at least one slots. The head slot transfers the information such as the required slot number, which is called as a control slot 51. The rest of the slots succeeding the control slot are used for the data transfer, which are called as data slots 52. The control slot is formed of the information shown in FIG. 7. The guard time 53 is a non signal section defined between one signal and another for avoiding the burst signal conflicts on the multiple access channel. A preamble 54 is a code taking two values of "0" and "1" repeatedly and alternately for clock regeneration by the master station. A sync. term 55 is a specific code for detecting a position of the burst signal. A control code 57 is set to a specific code in case the slave station requires to stop polling. The number of requested slot 58 contains information indicating the number of slot transmitted in the next polling, which is requested by the slave station. The CRC 59 is used for detecting a bit error of the control code and required slot number. The cyclic redundancy check (CRC) is used as the error detection code 59.

The first embodiment is described referring to the drawing. The first embodiment relates to the connectionless data communication.

Figure 8:
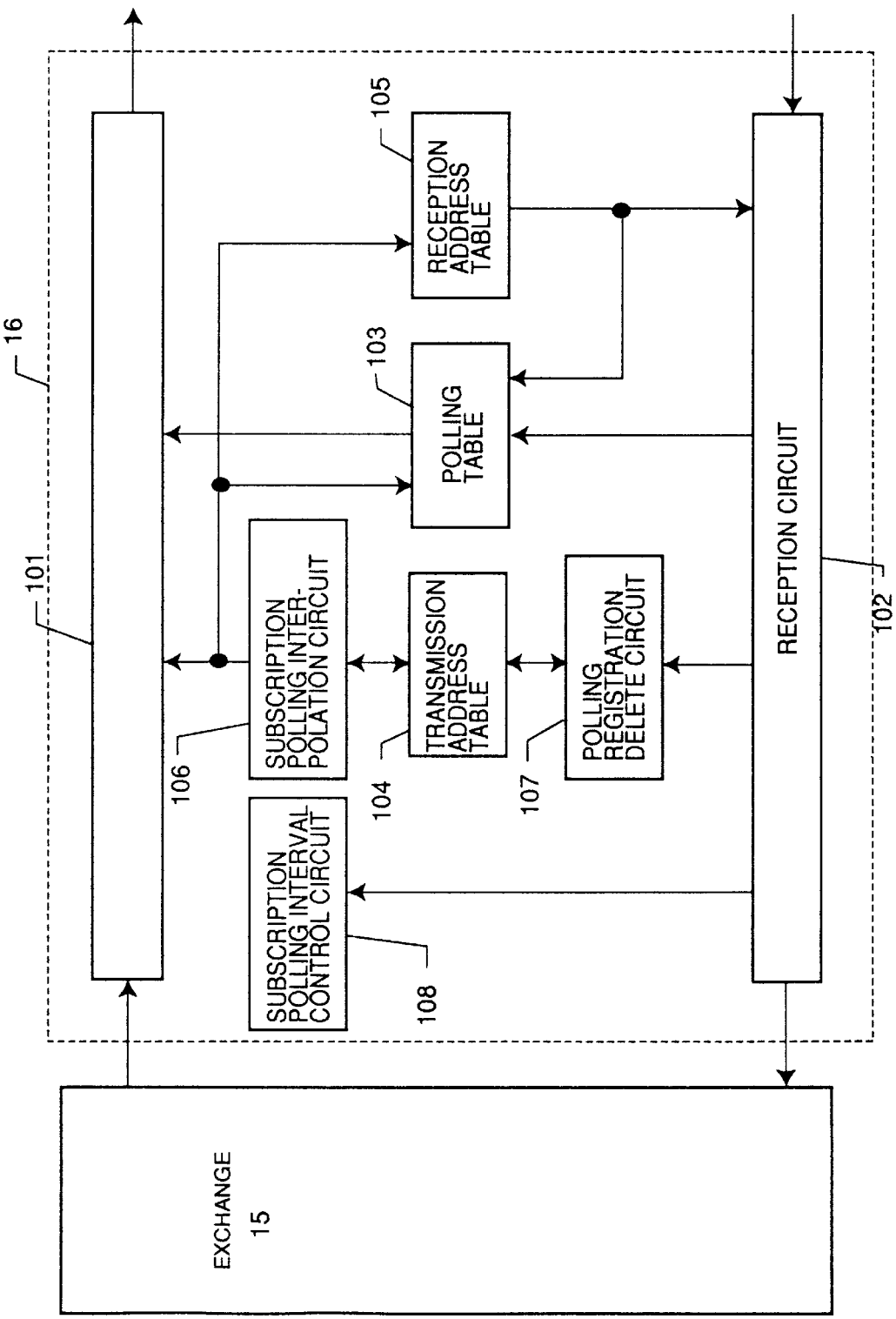
FIG. 8 is a block diagram showing a general construction of the master station of the first embodiment and the second embodiment of the present invention.

FIG. 8 shows a construction of the master station of the multiple access communication system as shown in FIG. 1. The master station comprises an exchange 15 and an access control unit for a master station 16. The access control unit for a master station 16 comprises a transmission circuit 101 for transmitting signals to a broadcasting type channel 13, a reception circuit 102 for receiving signals from a multiple access type channel 14, a polling table 103 for storing information of the allocated slot number and the required slot number in the past, a transmission address table 104 for registering the address of the slave station to which the polling is transmitted and a reception address table 105 for registering the expected reception time. It further comprises a subscription polling interpolation circuit 106 for interpolating the subscription polling signal, a polling registration deletion circuit 107 for registering and deleting the polling signal and a subscription polling interval control circuit 108 for controlling an interval between one subscription polling signal and another. The circuit construction and operation of each section is described below.

Figure 9:
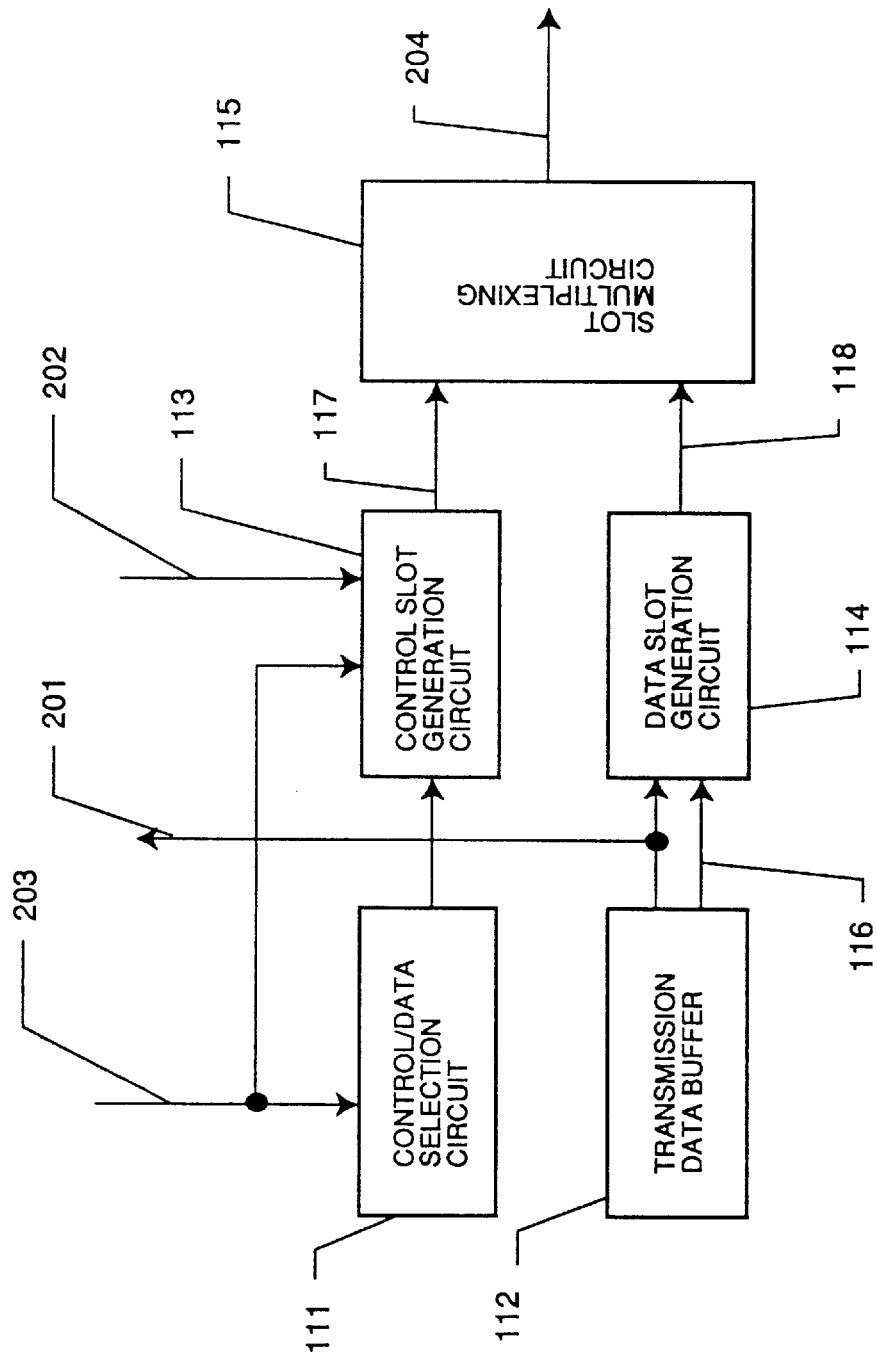
FIG. 9 is a block diagram showing in detail the construction of the transmission circuit of the master station of the first embodiment and the second embodiment of the present invention.

FIG. 9 shows a construction of the transmission circuit 101 as shown in FIG. 7. A control/data selection circuit 111 generates a control/data signal 201 which designates the slot to either the control slot 42 or the data slot 43. The control/data signal 201 is input to a control slot generation circuit 113, a data slot generation circuit 114 and an subscription polling insert circuit 106 described in detail as below. When the control/data signal 201 is set to the control slot, the control slot generation circuit 113 generates the control slot 42 as shown in FIG. 6 based on a transmission address signal 202 and an allocated slot signal 203 which have been input from the subscription polling interpolation circuit 106. The generated control slot 42 is input to a slot multiplexing circuit 115. When the control/data signal 201 is set to the control slot, the data slot generation circuit 114 generates the data slot 43 based on the data supplied from a transmission data buffer 112. The generated data slot 43 is input to the slot multiplexing circuit 115. The slot multiplexing circuit 115 multiplexes the input control slot 42 and data slot 43 and forms a frame as shown in FIG. 6. The frame is transmitted to the broadcast channel 13. The allocated slot signal 203 is input to the control/data selection circuit 111. The control/data selection circuit 111 set the control/data selection signal to the data slot just before the count reaches "0". When the count becomes "0", the control/data selection signal is set to the control slot.

Figure 10:
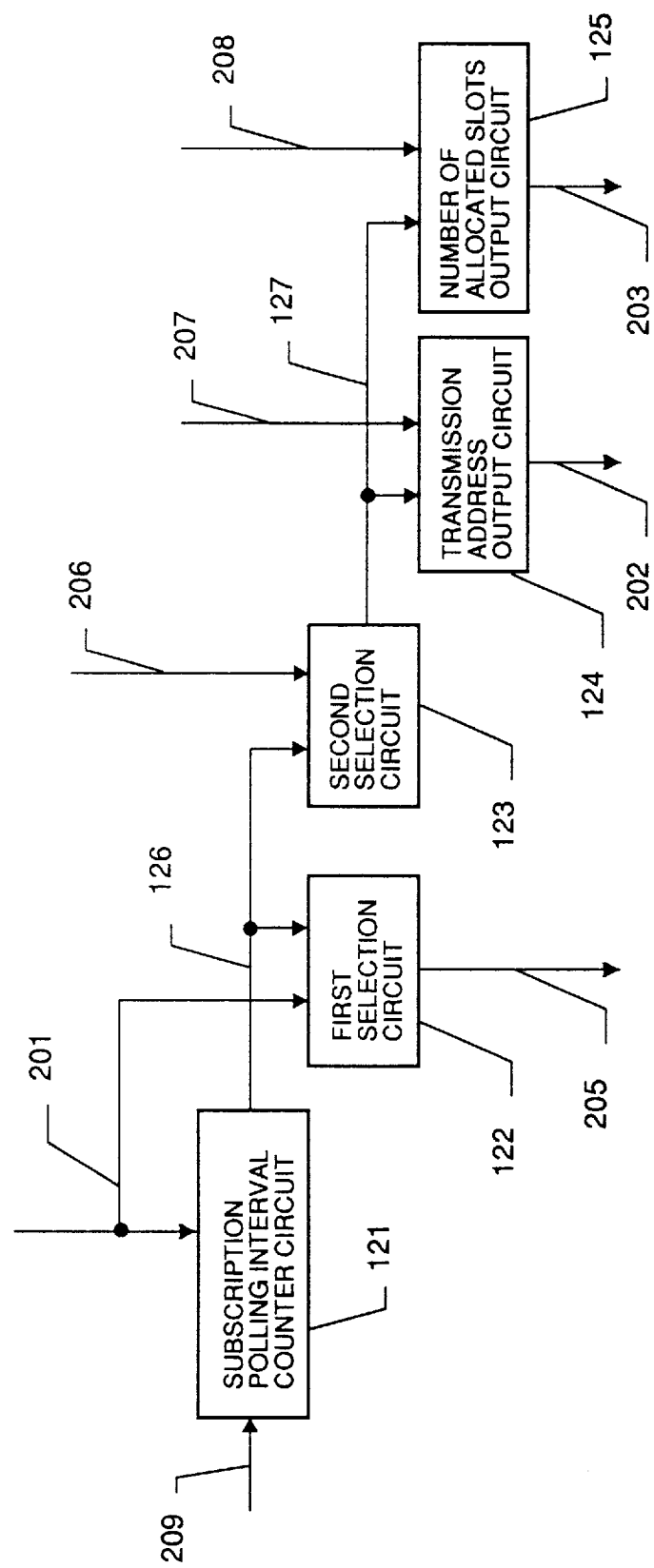
FIG. 10 is a block diagram showing in detail the construction of the subscription interpolation circuit of the master station of the first embodiment and the second embodiment of the present invention.

FIG. 10 shows a construction of the subscription polling insert circuit 106 shown in FIG. 8 in detail. This circuit controls to transmit the subscription polling at every intervals of predetermined times of regular polling transmissions. A control/data signal 201 of the transmission circuit 101 is input to a subscription polling interval counter 121 and a first selection circuit 122. A subscription polling interval counter 121 increments the count by 1 when the control/data signal 201 is set to the control slot. If the counter value conforms to a subscription polling interval signal 209 input from the subscription polling interval control circuit 108, a first selection signal 126 is set as the subscription polling and the counter value is cleared to "0". While in cases other than the aforementioned, the first selection signal 126 is set as the normal polling. The first selection signal 126 is input to the first selection circuit 122 and the second selection circuit 123. If the control/data signal 201 is set as the control slot and the first selection signal 126 is set as the regular polling, the first selection circuit 122 inputs a transmission trigger signal 205 to the transmission address table 104. A second selection circuit 123 receives a first selection signal 126 and an address invalid signal 206 from the transmission address table 104. The address nullifying signal 206 notifies whether a transmission reservation address signal 207 output by the transmission address table 104 is invalid or not. If the first selection signal 126 is set as the regular polling and the address nullifying signal 206 is determined not to be null, the second selection circuit 123 sets the second selection signal 127 as the regular polling. In cases other than the aforementioned, the second selection signal 127 is set as the subscription polling. If the input second selection signal 127 is the regular polling, the transmission address output circuit 124 outputs the transmission reservation address signal 207 input from the transmission address table 104 as a transmission adress signal 202. If the input second selection signal 127 is the subscription polling, it outputs the broadcasting address as a transmission address signal 202. If the input second selection signal 127 is the regular polling, an allocation slot number output circuit 125 outputs number of allocated reservation slots signal 208 input from the polling table 103 as the allocated slot number signal 203. If the second selection signal 127 is the subscription polling, it outputs "0".

Figure 11:
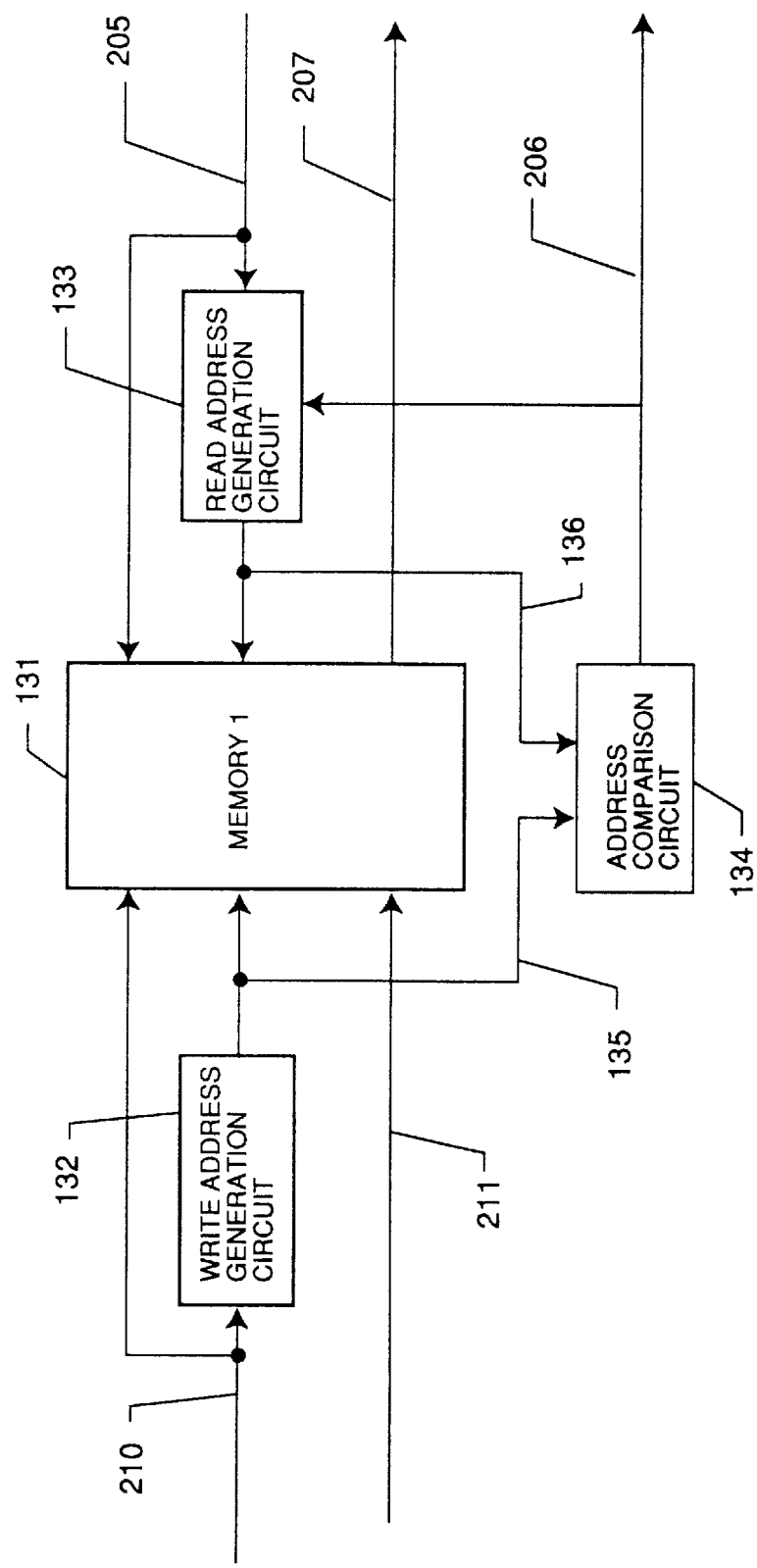
FIG. 11 is a block diagram showing in detail the construction of the transmission address table of the master station of the first embodiment and the second embodiment of the present invention.

FIG. 11 shows a construction of the transmission address table 104 shown in FIG. 8 in detail. The transmission address table 104 stores addresses of the slave stations to which polling signals are transmitted. It selects the address of the slave station at every polling transmission and stores the address of the slave station sending the signal thereto. First the section relating to the transmission operation is described below. The section relating to the reception operation is described later.

A memory 131 contains the list of transmission addresses in order of transmission. Upon receiving an input of a transmission trigger signal 205, the memory 131 outputs atransmission reservation address signal 207 is output which locates at a point designated by a read address signal 136 input from a read address generation circuit 133. An address comparing circuit compares the read address signal 136 with a write address signal 135. If both signals conform with each other, the address comparing circuit outputs an address nullifying signal 206 indicating that the address is null. Receiving an input of the transmission trigger signal 205, the read address generation circuit 133 increases the value of the read address 136 after the transmission reservation adress signal 207 is output and then points the next transmission reservation address signal. When the present address reaches the last address of the memory 131, the head of the memory 131 is designated. If the address nullifying signal input from the address comparison circuit 134 is set to null, the read address generation circuit 133 does not change the address.

Figure 12:
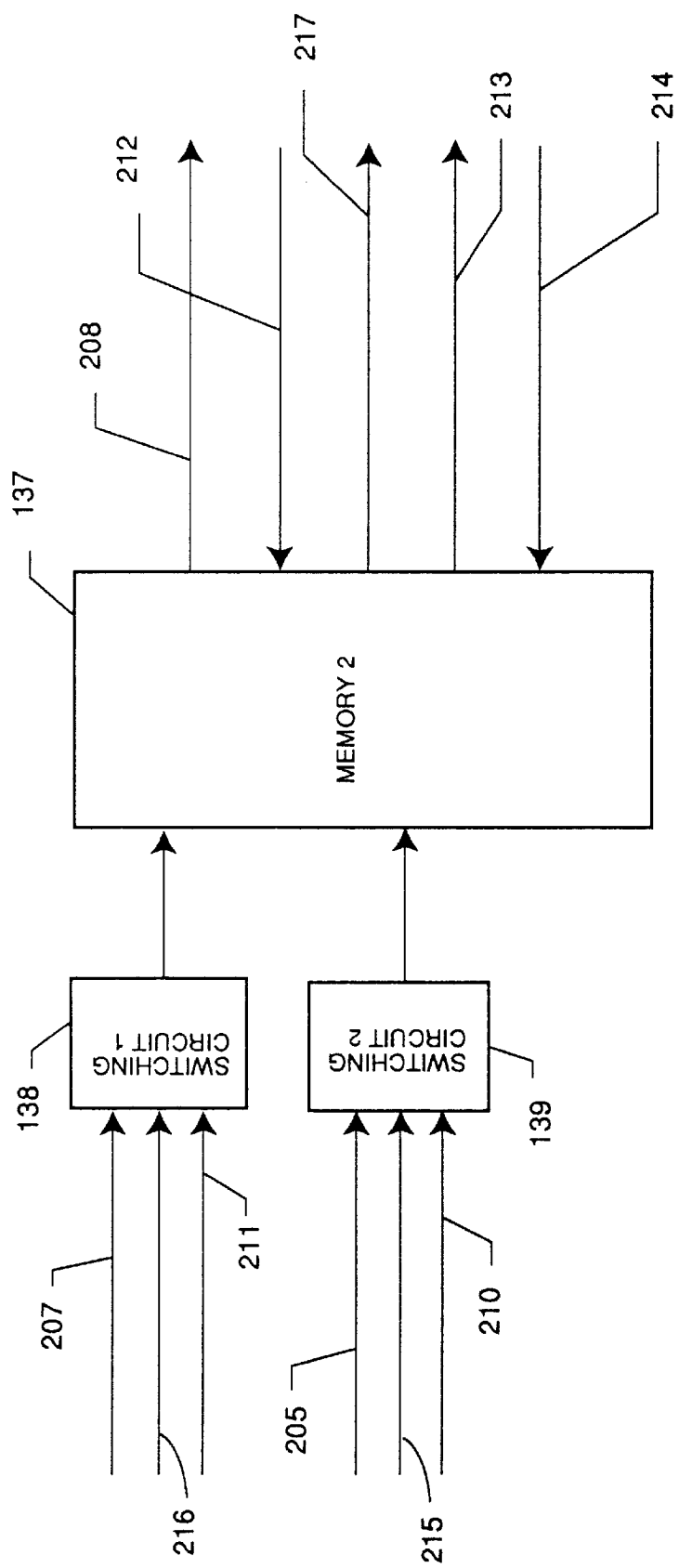
FIG. 12 is a block diagram showing in detail the construction of the polling table of the master station of the first embodiment and the second embodiment of the present invention.

FIG. 12 shows a construction of the polling table 103 shown in FIG. 8 in detail. This circuit stores the required slot number of each slave station and outputs an expected allocated slot number and an expected received slot number. It further stores the number of frequency where the slave station successively sends the required slot number of "0". The polling table 102 comprises a memory 137, a first selection circuit 138 and a second selection circuit 139. First, the section relating to transmission operation is described below. The section relating to reception operation is described later.

When the subscription polling insert circuit 106 supplies a transmission trigger signal 205 and an expected transmission reservation address signal 207, the required slot number is selected among addresses corresponding to the expected transmission address signal 207 of the memory 137. The resultant required slot number is output as a number of allocated reservation slots signal 208.

Figure 13:
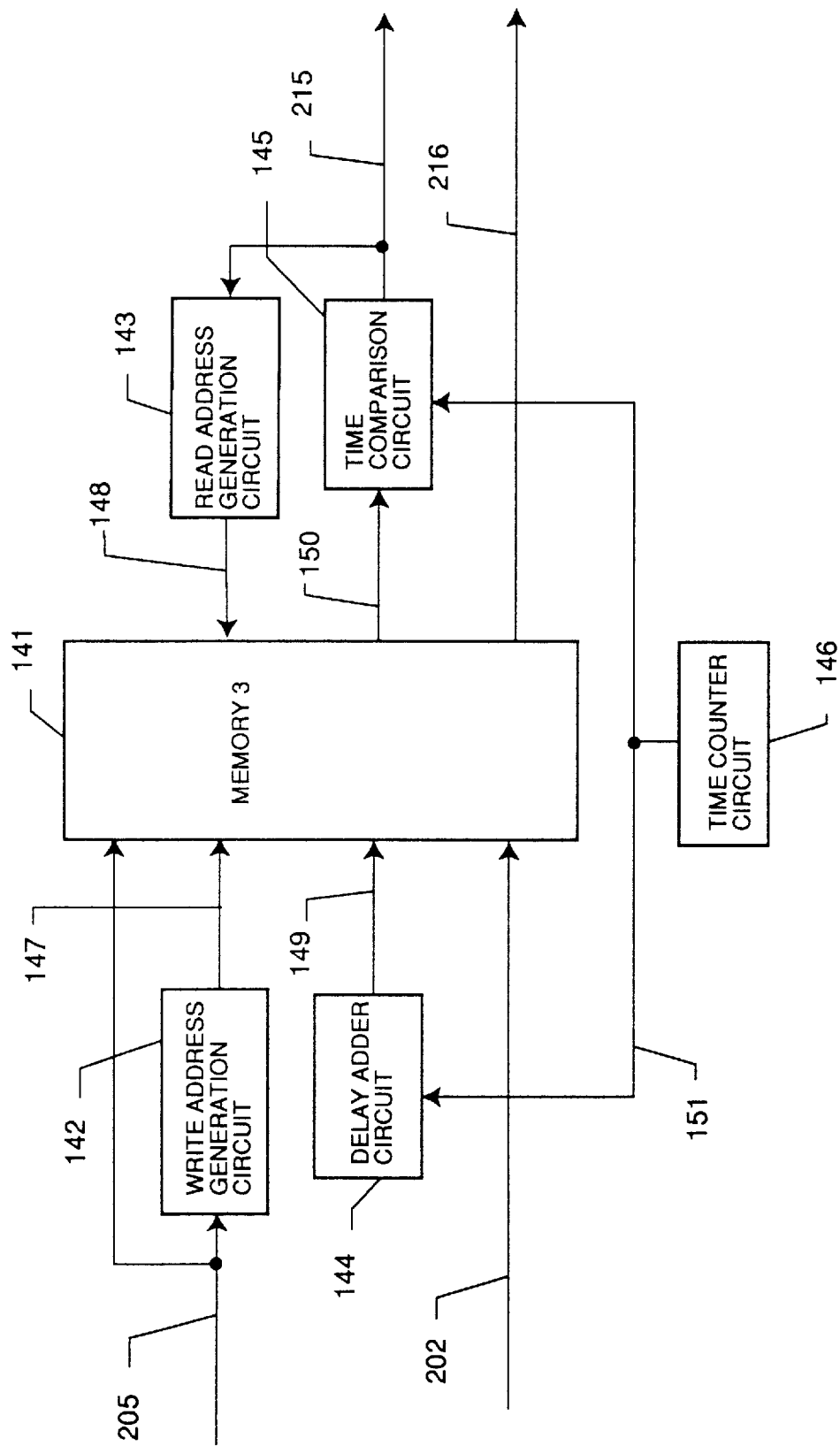
FIG. 13 is a block diagram showing in detail the construction of the reception address table of the master station of the first embodiment and the second embodiment of the present invention.

FIG. 13 shows a construction of the reception address table 105 shown in FIG. 8 in detail. This circuit generates a signal indicating the timing of the burst signal transmitted from the slave station via the multiple access type channel 14 based on the time point of the polling transmission via the broadcastingn type channel 13 and an address of the slave station transmitting the burst signal.

The transmission address and expected reception time are stored in a memory 141. A write address generation circuit 142 outputs a write address 147 indicating the area to which those data are written. The address is updated to the next write address at every input of a transmission trigger signal 205.

A time counter 146 measures the elapse of time. For example, supposing that the counter value is "0" while transmitting the slot and the time length for transmitting 5 slots are expressed by the time counter value of "5". A delay adder circuit 144 outputs an expected reception time obtained by adding a count value of the time counter to a predetermined value as th delay time. For example, supposing that the slot counter value is "8" at an output of the transmission trigger 205, if the time length equivalent to "10" slots elapses, the delay adder circuit 144 adds "10" to the counter value "8" and outputs "18" as the expected reception time.

A read address generation circuit 143 outputs a read address of the data stored in the memory 141. A time comparison circuit 145 compares the expected reception time 150 read out from the memory 141 with the counter value 151 of the time counter 146. For example, supposing that the time counter value is "8", the expected reception time "18" is read out from the memory. It is then compared with the current count value of the time counter 146. When the expected reception time conforms to the current value of the time counter 146, the comparing circuit outputs a reception trigger signal 215. Receiving an input of the reception trigger signal 215, the read address generation circuit 145 updates the read address 148 to the next address.

At every input of the transmission trigger signal 205, the reception reservation time signal 1 as numbered 149 and the transmission address signal at that moment are successively stored in the area provided with the updated address. Every time when the reception reservation time signal 2 as numbered 150 is read from the memory, the reception trigger signal 215 is output and a reception reservation address signal is read. The reception trigger signals indicating the timing of the burst transmitted from the slave station to which the polling is sent are generated. The reception trigger and the reception address are supplied to the reception circuit 102 and the polling table 103. Upon receiving an input of the reception trigger signal 215, the polling table 103 supplies the number of received reservation slots signal 217 of the slave station corresponding to the reception reservation address signal 216 to the reception circuit 102. The polling table 103 then supplies the number of zero requests 1 as numbered 213 to the polling registration deletion circuit 107.

Figure 14:
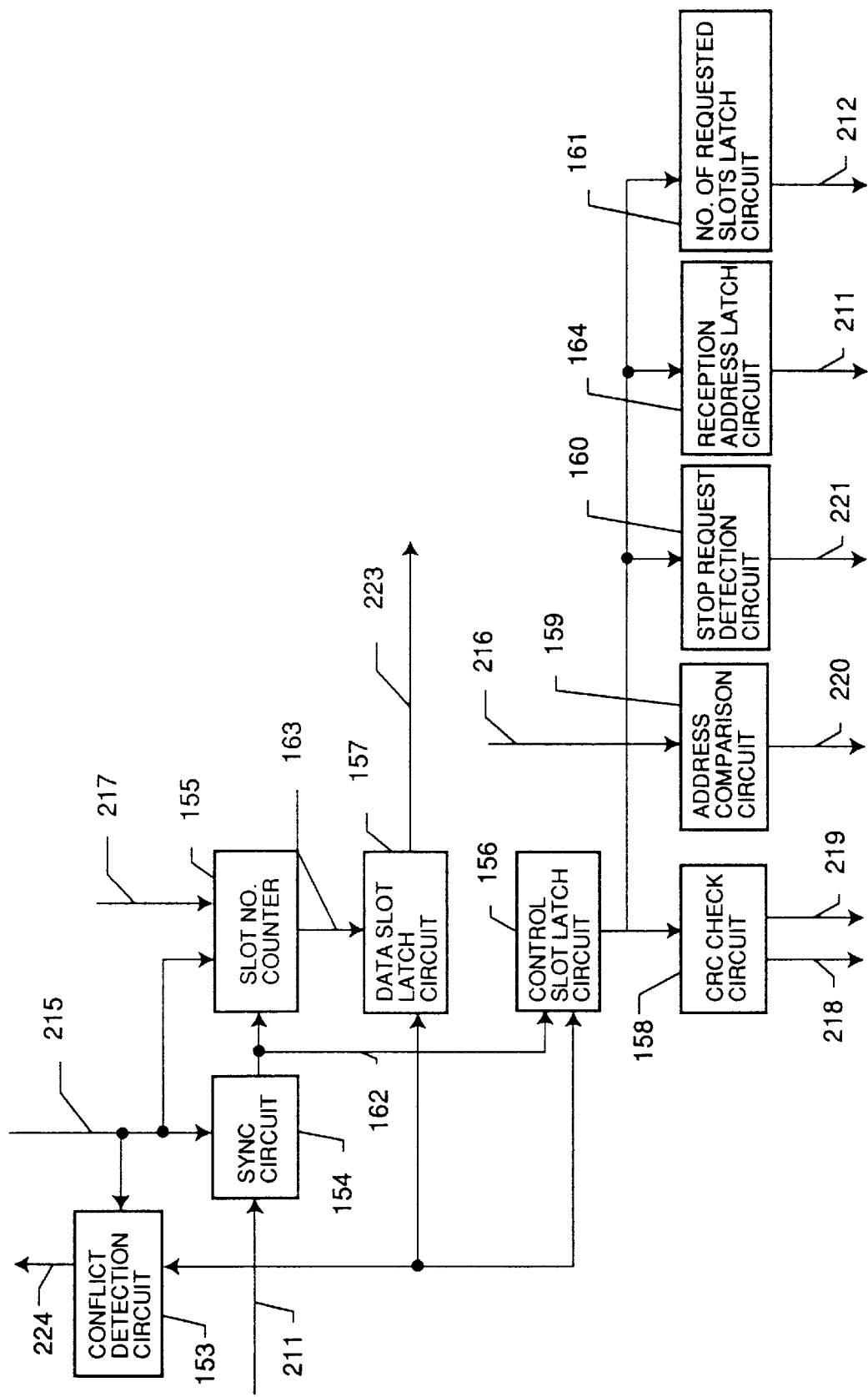
FIG. 14 is a block diagram showing in detail the construction of the reception circuit of the master station of the first embodiment and the second embodiment of the present invention.

FIG. 14 shows a construction of the reception circuit 102 shown in FIG. 8 in detail. This circuit receives each slot through synchronizing burst signals transmitted on the multiple access type channel 14. A synchronization circuit 154 for detecting the sync. term 55 shown in FIG. 7 receives inputs of a reception address signal 211 transmitted via the multiple access type channel 14 and the reception trigger signal 215 in the reception address table 105 shown in FIG. 13. When receiving an input of the reception trigger signal 215, the synchronization circuit 154 starts detecting the sync. term 55. When detecting the sync. term 55, the synchronization circuit 154 outputs a synchronous signal 162. The synchronous signal 162 contributes to identification of the time point of the burst signal transmitted from the slave station. When the sync. term 55 is not detected, the burst signal is lost.

The synchronous signal 162 is input to a control slot latch circuit 156 for holding the control slot and a slot number counter 155 for counting the number of arriving data slots. When receiving an input of the synchronous signal 162, the control slot latch circuit 156 latches the control slot 51 contained in the burst signal. The information of the latched slot 51 is output as an address 56, a control code 57 and a number of requested slots 58, respectively. All bits of the control slot are input to a CRC check circuit 158. The CRC check circuit 158 compares the address 56 of the control slot 51 shown in FIG. 7 with CRC 59 which has received the value of the cyclic redundancy code based on the control code 57 and the number of requested slots 58. When both signals conform with each other, a normal reception signal 218 is output. When both signals do not conform, an abnormal reception signal 219 is output.

A slot number counter 155 receives an input of number of received reservation slots signal 217 in the polling table 103. When receiving an input of the synchronous signal 162, the slot number counter 155 latches the number of received reservation slots signal 217 and decrement the count value at every arrival of the data slot. The data slot latch circuit 157 latches every data slot 52 successively transmitted to the control slot until the slot number counter 155 counts "0". The slot latched by the data slot latch circuit 157 is output to the exchange 15.

An reception reservation address signal 216 compares a reception reservation adress signal with a broadcasting address. When both addresses conform with each other, it outputs a subscription polling signal indicating the response to the subscription polling. A stop request detection circuit 160 checks the received control code. If the received code 57 is the polling stop request code, a polling stop request signal is output. The reception address latch circuit 164 outputs the received address as a reception address signal 211. The number of requested slots latch circuit 161 latches the received number of requested slots 58 and outputs a number of requested slot signal 212.

FIG. 14 shows a construction of the polling registration deletion circuit 107 shown in FIG. 9 in detail. This circuit registers the address of the slave station to which the polling should be transmitted to the transmission address table 104. The transmission address registration is executed only in 4 conditions described as below.

(1) Correctly receiving the slave station's response to the regular polling; no polling stop request sent from the slave station; and the number of requested slots is 0 or more.

(2) Correctly receiving the slave station's response to the regular polling; no polling stop request sent from th slave station; the number of the requested slot number was 0 in the past or the frequency of abnormal reception of the slave station's response is n times or less. The number "n" can be set to any integer.

(3) The response to the regular polling is wrong but the number of the requested slot number was 0 in the past or the frequency of abnormal reception of the slave station's response is n times or less.

(4) Receiving a response from the specific slave station to the subscription polling.

In case the slave station sends zero requested slot predetermined times or more; or the slave station generates a polling stop request, such slave station is not registered to the transmission address table. The slave station responding to the subscription polling is registered to the transmission address table.

A zero request detection circuit 167 and a number of zero requests comparison circuit 168 are prepared for the purpose of judging the above conditions. If the number of requested slots signal 212 is "0", the zero request detection circuit 167 outputs a zero request detection signal 177. A number of zero requests 1 as numbered 213 output from the polling table 102 is input to the number of zero requests comparison circuit 168 and an adder circuit 169. If the number of zero requests is equal to or more than a predetermined value, the number of zero requests comparison circuit 168 outputs a repeated zero request detection signal 178.

Based on the above conditions, a subscription request decision circuit 170, normal response circuit 171, zero request decision circuit 172 and non-response decision circuit 173 judges the polling registration. The subscription request decision circuit 170 judges if a response to the subscription polling is received. If the subscription polling signal 220 is input and a normal reception signal 218 is input, this circuit outputs a subscription request signal 179. If the subscription polling signal 220 is not input, the normal reception signal 218 is input, no polling stop request signal 221 is received, a zero request detection signal 177 is input and the repeated zero request detection signal is not received, the zero request decision circuit 172 outputs a zero request signal 181. If the subscription polling signal 220 is not input, an abnormal reception signal 219 is input and the repeated zero request detection signal 178 is not input, the non-response decision circuit 173 outputs a non-response signal 182.

If one of the subscription request signal 179, normal response signal 180, zero request signal 181 and non-response signal 182 is output, a registration signal generation circuit outputs a reception data preservation signal 210. If either the subscription request signal 175 or the normal response signal 180 is output, the clear/addition decision circuit 175 sets the clear/addition selection signal to the clear. If either the zero request signal 181 or the non-response signal 182 is output, it sets the clear/addition selection signal to addition. The adder circuit 169 outputs the value obtained by adding 1 to the number of zero requests 1 as numbered 213. If the clear/addition selection signal 183 is set to clear, the selection circuit 176 outputs "0" as the number of zero requests 2 as numbered 214. While if the clear/addition selection signal 183 is set to addition, the selection circuit 176 outputs the value input from the adder circuit 169 as the number of zero requests 2 as numbered 214. Supposing that the number of zero requests 2 as numbered 214 is stored in the polling table 103, if the number of requested slot is not "0" or newly registered resulted from the subscription polling, the zero request signal is set to "0". In case of zero request or non-response, the value obtained by adding 1 thereto is stored.

The reception data preservation signal 210 is input to the polling table 103 and the transmission address table 104. When receiving an input of the reception data preservation signal 210, the polling table 103 preserves the number of requested slots signal 212 and the number of zero requests 2 as numbered 214 at a point indicated with the reception address signal 211 in the memory 137.

When receiving an input of the reception data preservation signal 210, the transmission address table 104 preserves the reception address signal 211 for the next polling. When receiving an input of the reception data preservation signal 210, the memory 131 preserves the reception address signal 211 at a point designated by the write address signal 135 input from the write address generation circuit 1 as numbered 132. This address is taken out as the transmission reservation address signal 207 at transmission as described before. When receiving an input of the reception data preservation signal 210, the write address generation circuit 1 as numbered 132 increases the value of the write address signal 135 after preserving the reception address signal 211 and points the location where the reception address should be written in the next time. If the current write address reaches the last address of the memory 131, the head of the memory 131 is designated.

The address of the slave station registered in the transmission address table 104 is deleted during the polling transmission. The address is registered again at reception of the burst from the slave station. At this time, the polling registration deletion circuit 107 judges whether or not the address is registered in the transmission address table. The polling judged as unnecessary is deleted. The subscription polling interpolation circuit 106 interpolates the subscription polling between the normal pollings on a regular basis. If the response to the subscription polling is received, the polling registration deletion circuit 107 registers the slave station sending the response to the transmission address table and starts polling.

Figure 16:
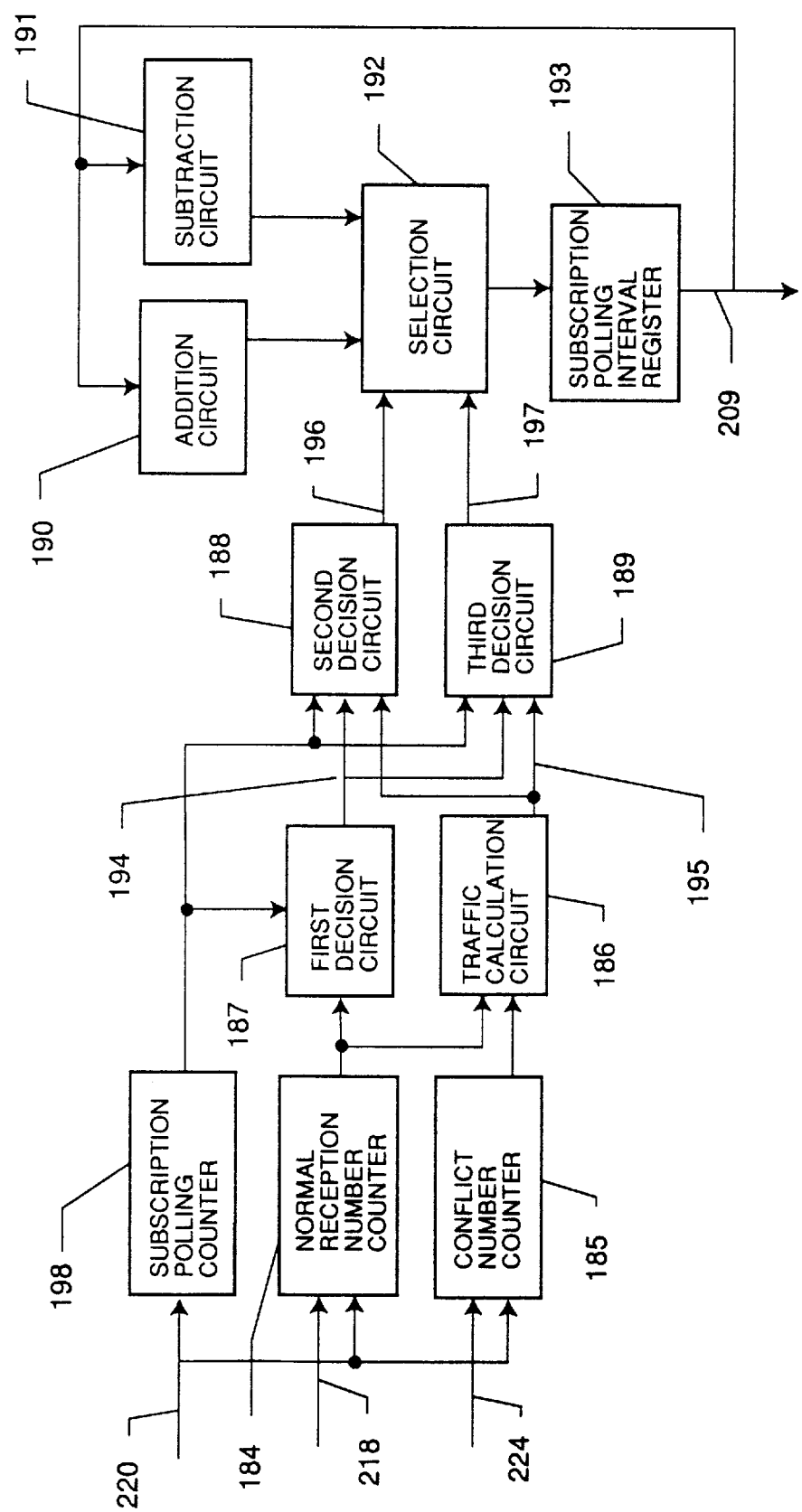
FIG. 16 is a block diagram showing in detail the construction of the subscription polling interval control circuit of the master station of the first embodiment and the second embodiment of the present invention.

Finally the description is given with respect to the operation of the subscription polling interval control circuit 108 for defining the interval of the subscription polling. FIG. 16 is a construction of the subscription polling interval control circuit 108 shown in FIG. 8 in detail. This circuit controls the interval of the subscription polling so that the slave station succeeds in responding to the subscription polling to the highest degree. The subscription polling counter 198 increments 1 at every input of the subscription polling signal 220 and counts the number of subscription polling transmitted so far. When receiving inputs of the subscription polling signal 220 and the conflict detection signal 224 simultaneously, the conflict number counter 185 increments the count value and counts the number of conflicts against the subscription polling. A traffic calculation circuit adds the value two times the count value of the conflict number counter to the count value of the normal reception number counter 184. The resultant value is considered as the total number of the response to the subscription polling and output as the traffic amount signal 195. The first judgement circuit calculates the ratio of the count value of the normal reception number counter 184 to that of the subscription polling counter 198. If the calculated value is equal to or less than the threshold value, a throughput drop signal 194 is output. If the throughput drop signal 194 is input, the second judgement circuit calculates the ratio of the value of the traffic amount signal 195 to the count value of the subscription polling counter 198. If the calculated value is equal to or more than a predetermined threshold value, the second judgement circuit outputs the traffic increase signal 196 indicating larger amount of traffic compared with the number of the subscription polling. If the throughput drop signal 194 is input, the third judgement circuit calculates the ratio of the value of the traffic amount signal 195 to the count value of the subscription polling counter 198. If the calculated value is equal to or less than a predetermined threshold value, the third judgement circuit outputs a traffic decrease signal 197 indicating smaller amount of traffic compared with the number of the subscription polling.

A subscription polling interval register 193 keeps the interval for transmitting the subscription polling and outputs a subscription polling interval signal 209. The addition circuit 190 outputs a value obtained by adding a fixed value to the value of the subscription polling interval. A subtraction circuit 191 likewise outputs a value obtained by subtracting a fixed value from the value of the subscription polling interval. If the traffic increase signal is input, the selection circuit selects the output value of the addition circuit 190 and preserves it as a new subscription polling interval in the subscription polling interval register 193. On the contrary if the traffic decrease signal 197 is input, the selection circuit selects the output value of the subtraction circuit 191 and preserves it as a new subscription polling interval in the subscription polling interval register 193.

Next, the description is given with respect to the operation of the slave station in the first embodiment according to the present invention.

Figure 17:
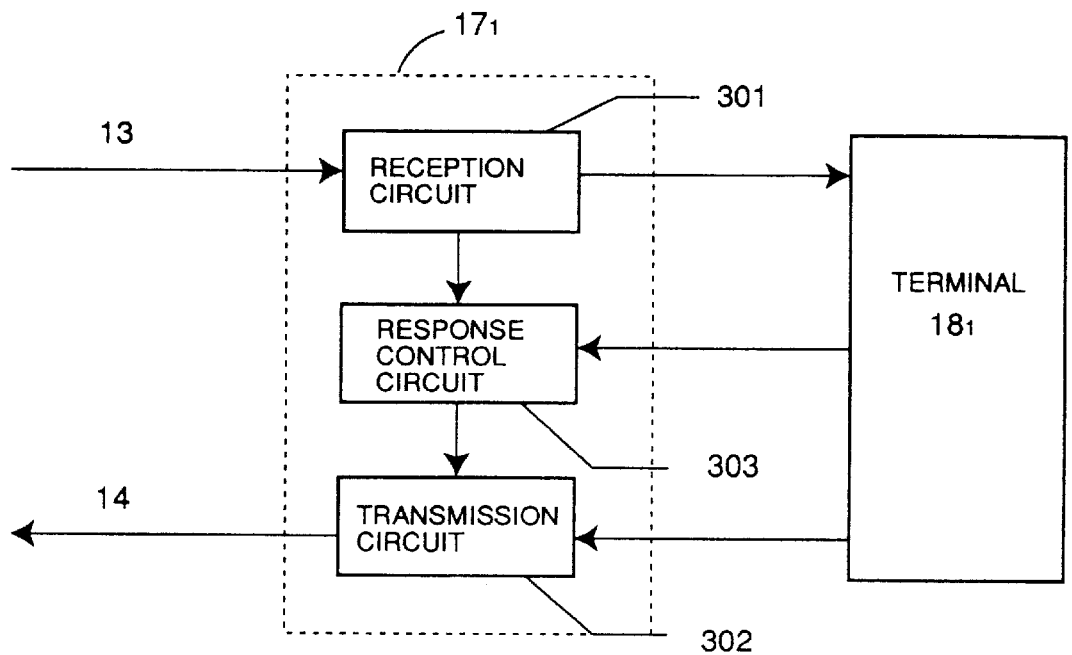
FIG. 17 is a block diagram showing a general construction of the slave station of the first embodiment and the second embodiment of the present invention.

FIG. 17 shows a schematic view of a construction of the slave station in the multiple access communication system shown in FIG. 1. The slave station 12 comprises an access control unit for slave station 17 and a terminal 18. The access control unit for slave station 17 is provided with a reception circuit 301 for receiving a signal from the broadcasting type channel 13 and a transmission circuit 302 for transmitting a signal to the multiple access type channel 14. The response control circuit 303 sets the polling stop request and controls the response to the subscription polling.

Figure 18:
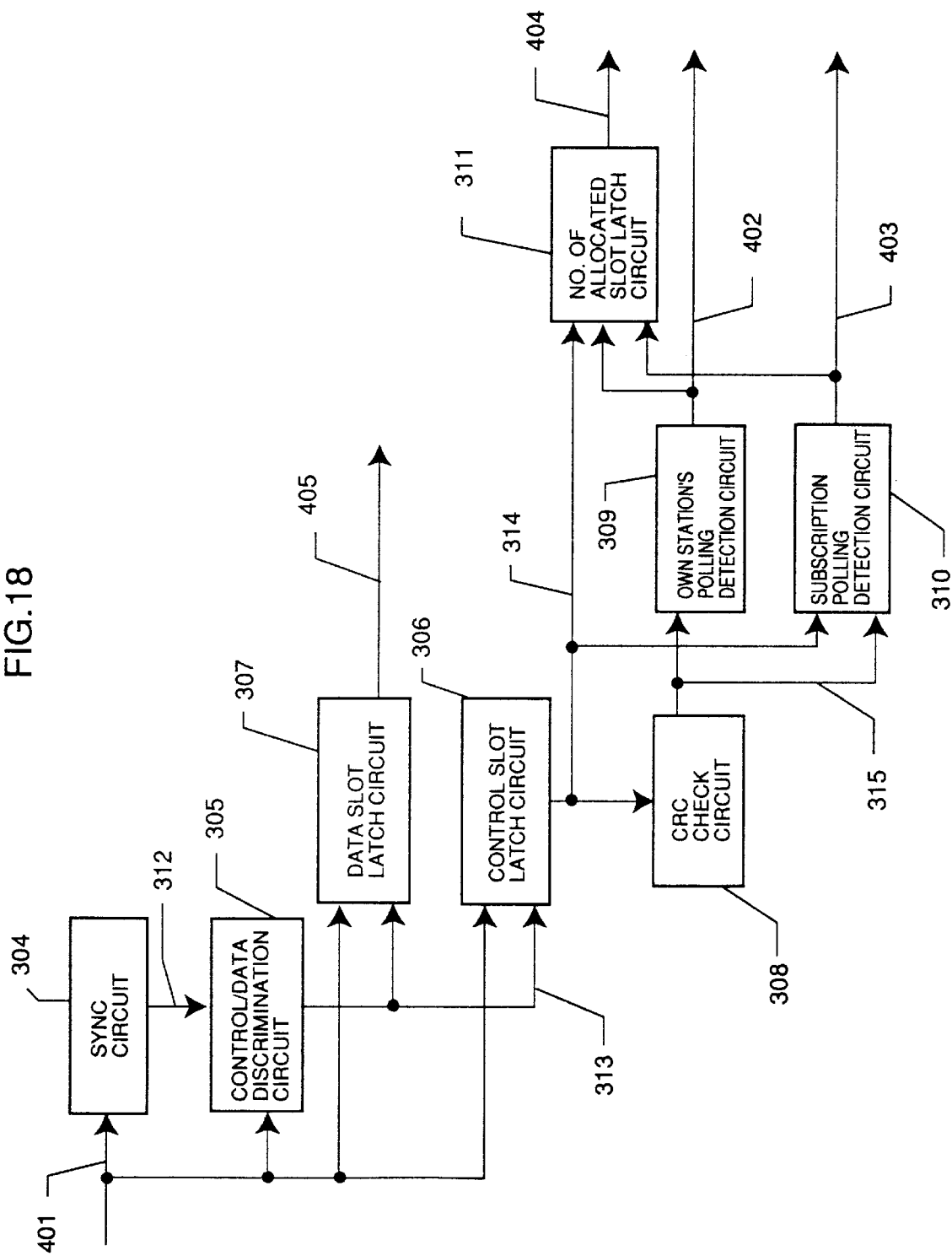
FIG. 18 is a block diagram showing in detail the construction of the reception circuit of the slave station of the first embodiment and the second embodiment of the present invention.

FIG. 18 shows a construction of the reception circuit 301 shown in FIG. 17 in detail. This circuit executes regular polling from the broadcasting type channel 13 received by the slave station and reception of the subscription polling. A reception signal 401 transmitted via the broadcasting type channel 13 is input to the synchronization circuit 304, control/data discrimination circuit 305, control slot latch circuit 306 and data slot latch circuit 307. The synchronization circuit 304 detects the location of the slot in accordance with the reception signal 401 and outputs a synchronous signal 312 indicating the head point of the slot. The control/data discrimination circuit 305 checks the control/data information 44 within the slot shown in FIG. 6 which has been transmitted based on the synchronous signal 312 and outputs the control/data discrimination signal 313. If the control/data signal 313 indicates the control slot, the control slot latch circuit 306 latches the transmitted slot. If the control/data signal 313 indicates the data slot, the data slot latch circuit 307 latches the transmitted slot. The CRC check circuit 308 obtains CRC by calculating the address 45 of the control slot latched by the control slot latch circuit and the number of the allocated slot 46. The resultant CRC is compared with the CRC 47 of the control slot. If both values conform with each other, a normal reception signal 315 is output. When receiving an input of the normal reception signal 315, an own station polling detection circuit 309 compares the received address information 45 with the broadcasting address. If both addresses conform with each other, a subscription polling reception signal is output. When receiving an input of the own station polling reception signal 402 or a subscription polling reception signal 403, the number of allocated slots latch circuit 311 latches the number of allocated slots 46 within the received control slot and outputs the number of allocated slots signal 404.

Figure 19:
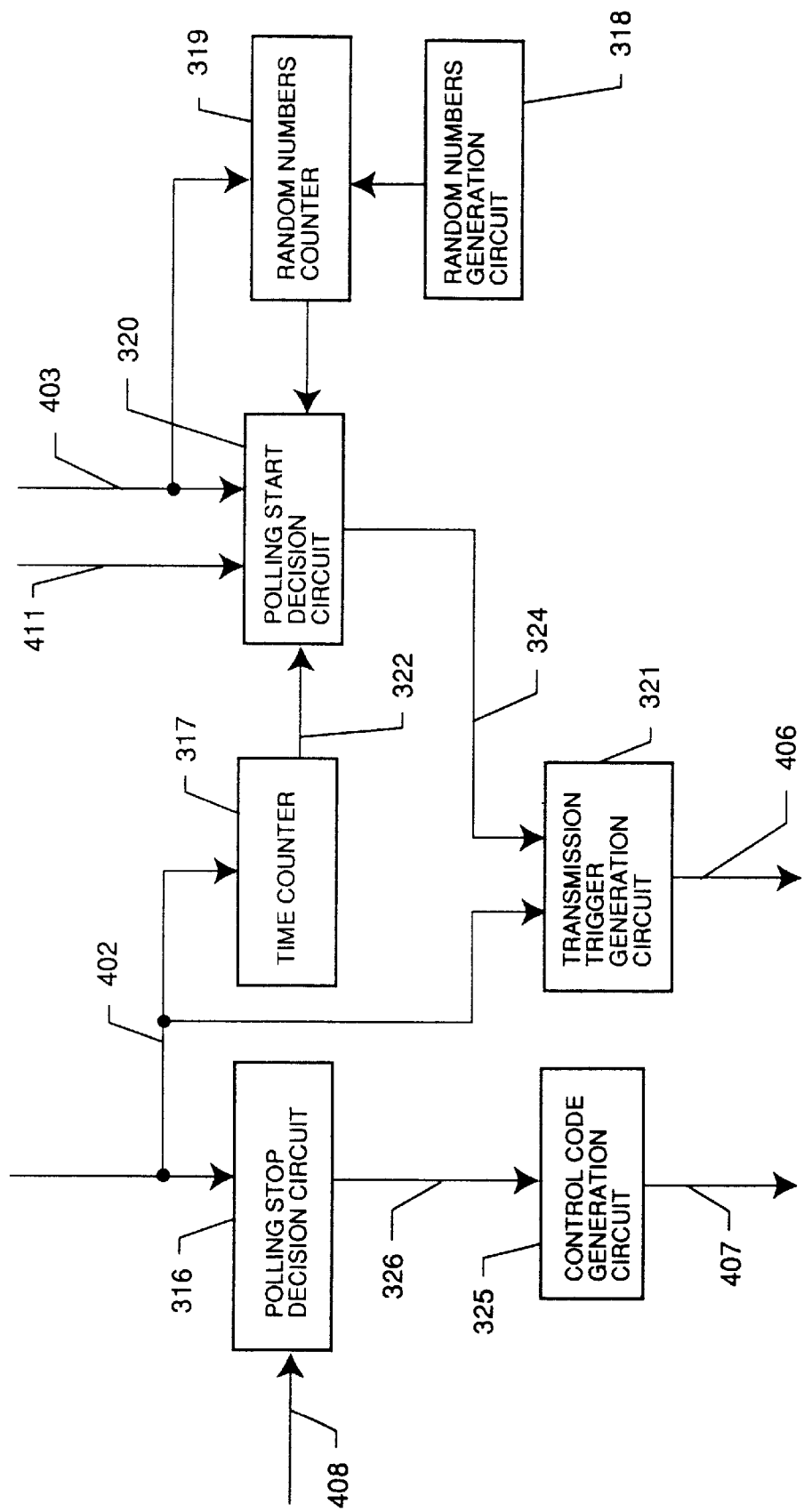
FIG. 19 is a block diagram showing details of the response control circuit of the slave station of the first embodiment of the present invention.

FIG. 19 shows a construction of the response control circuit 303 shown in FIG. 17 in detail. This circuit controls the response to the subscription polling and transmission of the polling stop request signal. A time counter 317 is a circuit indicating the time elapsed from the reception of the last polling to the own station. It is reset upon receiving an input of the own station polling reception signal 402. The random numbers generation circuit 318 generates the random numbers ranging from 1 to a predetermined number. The random numbers counter 319 down counts the random number set by the random numbers generation circuit 318 at every input of the subscription polling reception signal 403. If the count value of the time counter 317 reaches a predetermined value or more, the polling start decision circuit 320 determines that the polling is stopped. At this time, the polling start decision circuit 320 determines data generation if the number of requested slots signal 411 exceeds "0". When the count value of the random numbers counter becomes "0" and the subscription polling reception signal 403 is input, the polling start request signal 324 is output. When receiving an input of the polling start request signal 324, the random numbers generation circuit 318 generates a new random number, which is set to the random numbers counter 319. This sets the frequency of re-transmission in case signals conflict. If the time counter is equal to or less than a predetermined value, the polling start decision circuit 320 determines that the polling is received and generates no polling start request signal 324. If the number of requested slots signal 411 is "0", it is determined to have no data and generates no polling start request signal 324. The polling start request signal 324 is not generated until the count value of the random numbers counter 319 reaches "0".

When receiving an input of an own station polling reception signal 402, the polling stop decision circuit 316 outputs the polling stop request signal 326 as far as the terminal stop signal 408 has been input from the terminal. When receiving an input of the polling stop request signal 326, the control code generation circuit 325 sets the control code to the polling stop request. When receiving an input of the own station polling reception signal 402 or the polling start request signal 324, the transmission trigger generation circuit generates the data slot signal.

Figure 20:
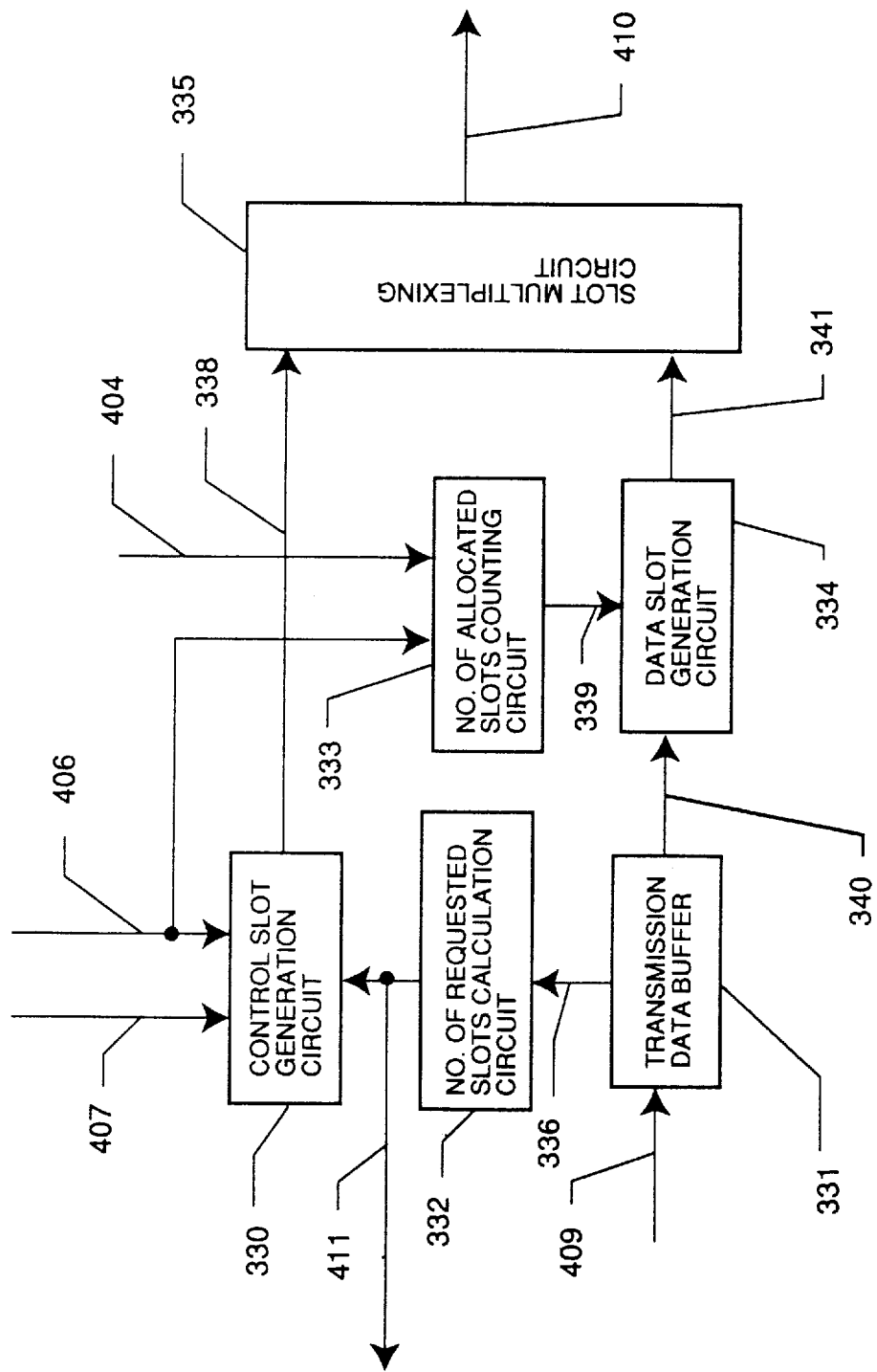
FIG. 20 is a block diagram showing in detail the construction of the transmission circuit of the slave station of the first embodiment and the second embodiment of the present invention.

FIG. 20 shows a construction of the transmission circuit 302 shown in FIG. 17 in detail. This circuit generates and transmits the control slot and data slot. A transmission data buffer 331 executes buffering of the data input from the terminal. A number of requested slots calculation circuit 332 counts the data amount within the data buffer by unit of slot.

When receiving an input of the transmission trigger signal 406, the control slot generation circuit 330 generates the control slot 51 shown in FIG. 7 according to the input control code signal 407 and the number of requested slots signal 411 input from the number of requested slot calculation circuit, which is input to the slot multiplexing circuit 335. When receiving an input of the transmission trigger signal, the allocated slot number counter 333 latches the number of allocated slots signal 404 and down counts the resultant value. The data slot generation circuit 334 generates data slots 52 shown in FIG. 7 successively until the value kept by the allocated slot number counter reaches "0". The generated data slot is input to the slot multiplexing circuit 410. The slot multiplexing circuit 410 multiplexes the input control slot 51 and the data slot 52. The resultant signal is transmitted as the burst signal to the multiple access type channel 14.

Figure 15:
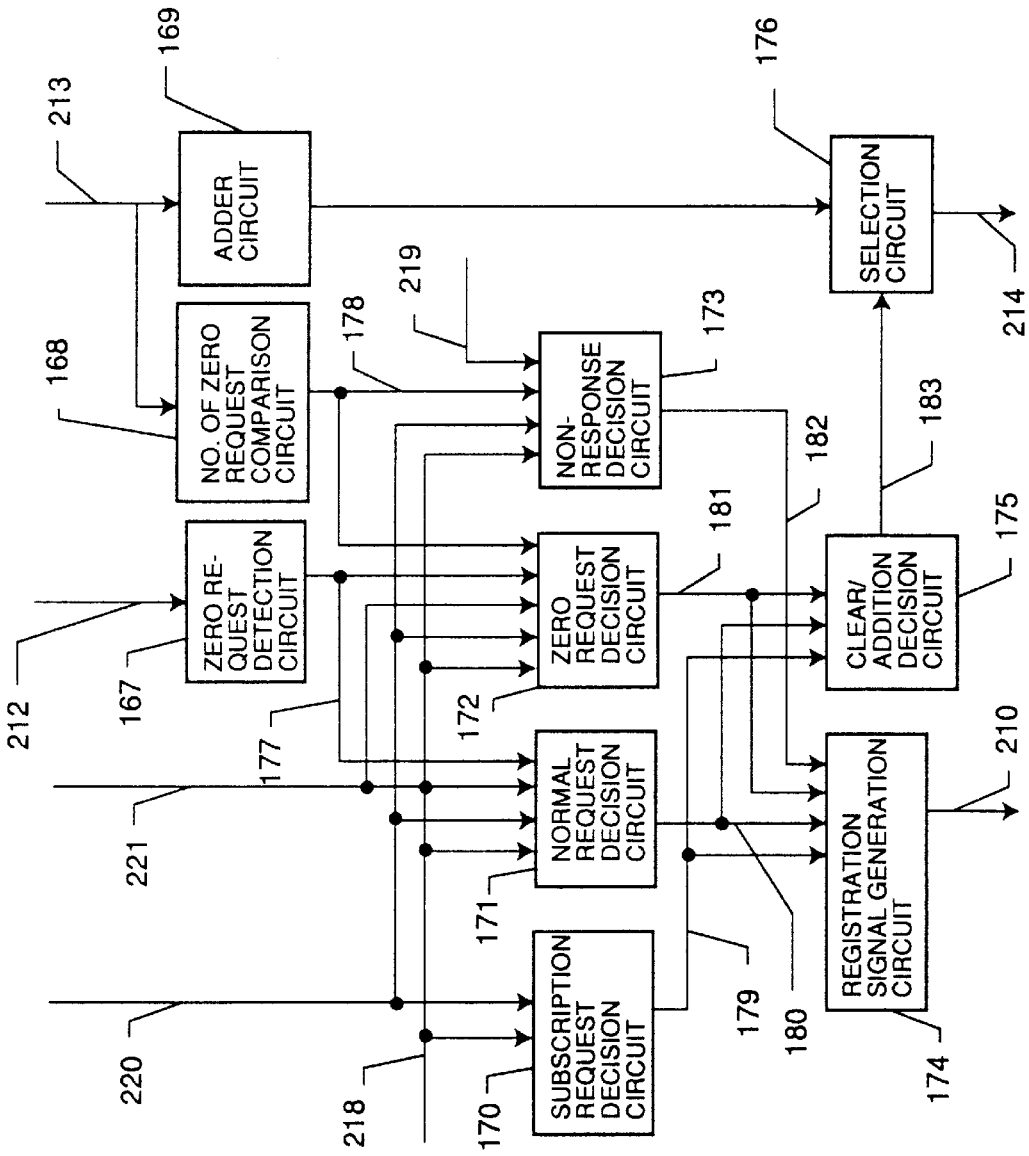
FIG. 15 is a block diagram showing in detail the construction of the polling registration deletion circuit of the master station of the first embodiment of the present invention.
Figure 21:
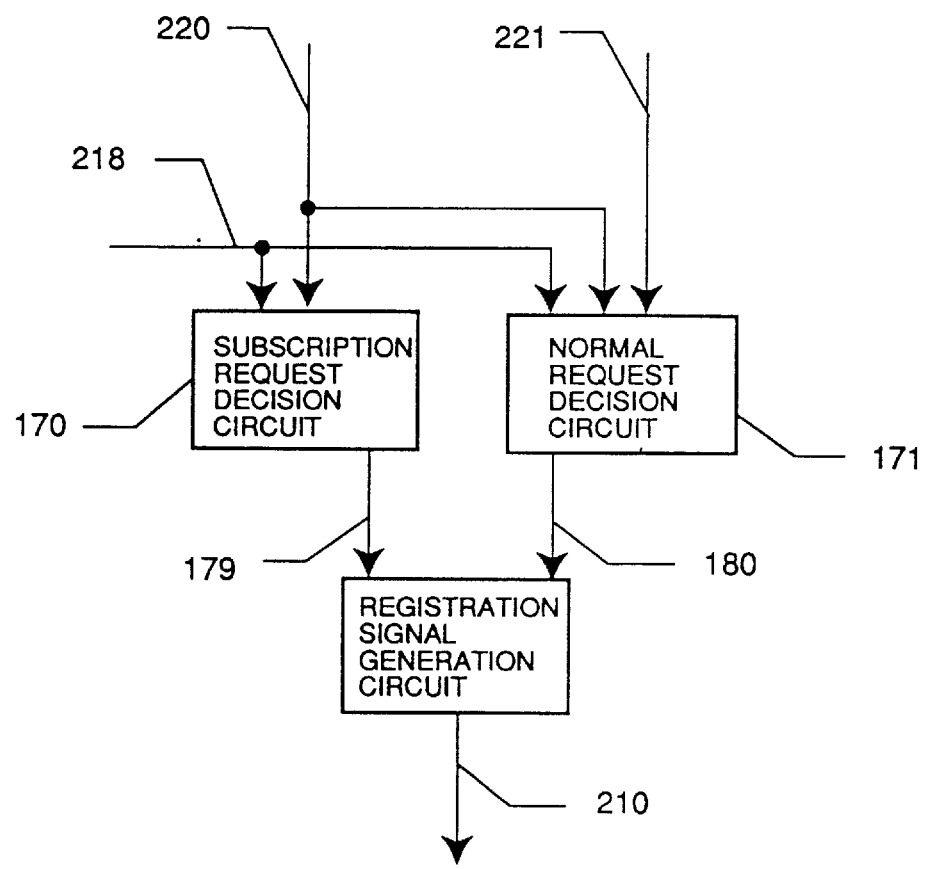
FIG. 21 is a block diagram showing details of the polling registration deletion circuit of the second embodiment of the present invention.

Next, the second embodiment is described referring to the drawings. The second embodiment relates to the connection type data communication. The operation of the second embodiment is almost the same except different points as described below. The master station uses the construction as the polling registration deletion circuit shown in FIG. 21 instead of using the construction shown in FIG. 15. When processing the connection type data, the polling is not stopped by the determination of the master station. When receiving inputs of the normal reception signal 218 and the subscription polling signal 220, the subscription request decision circuit generates the subscription request signal 179. When receiving an input of the normal reception signal 218 and no inputs of the polling stop request signal 220 nor the polling stop request signal 221, the normal response circuit 171 generates the normal response signal 180. When receiving an input of the subscription request signal 179 or the normal response signal 180, the registration signal generation circuit outputs the reception data preservation signal 210.

While the slave station uses the response control circuit having a construction shown in FIG. 22 instead of that shown in FIG. 19. The number of connection register circuit retains the number of the connection in use during the current communication. At every input of the connection establish signal 420, the value 1 is added to the retained value. At every input of the connection complete signal 421, the value 1 is subtracted from the retained value. The calculated value is output as the number of connection signal 351. The connection signal 351 is input to the polling start decision circuit 320 in place of the number of requested slots signal 411 shown in FIG. 19. It is further input to the polling stop decision circuit 316 in place of the terminal stop signal 408. If the number of connection signal 351 is equal to or more than 1, the polling start decision circuit 320 determines the data generation and tries to respond to the subscription polling. At this time, the operation to the polling non-received time 322 and the counter value of the random counter is the same as that of the circuit shown in FIG. 19. When the number of connection signal 351 becomes "0", the polling stop decision circuit 316 outputs the polling stop request signal 326.

Being used in the multiple access system according to the polling method, the present invention improves efficient use of the channel and minimizes the delay of the time during the transmission of the slave station. The present invention further optimizes the number of the subscribing polling for re-starting the polling, thus deleting unnecessary subscribing polling as well as realizing efficient use of the channel.

What is claimed is:

1. A multiple access system having a master station, at least one slave station, a broadcasting channel for transmitting a signal from said master station to said slave station and a multiple access channel for broadcasting a signal from said slave channel to said master station in which said master station communicates with said slave station based on a polling system, said master station comprises:

polling stop means for detecting whether a slave station is in communication and stopping polling for a slave station not in communication;
 subscription polling transmission means for transmitting broadcasting type subscription polling; and
 polling resume means for resuming polling for a slave station that has responded to said subscription polling; and said slave station comprises:
  polling request means for transmitting a polling resume request to said master station, responding to said subscription polling.

2. The multiple access system of claim 1, wherein said slave station further comprises means for determining subscription polling for response based on random numbers when response signal conflict occurs due to a plurality of slave station's simultaneous response to subscription polling.

3. The multiple access system of claim 1, where a data transmission type between said master station and said slave station is of connectionless type, wherein said polling stop means comprises:

means for monitoring request band width of said slave station; and
 means for stopping polling for a slave station of which request band width is zero in a certain period.

4. The multiple access system of claim 1, wherein said subscription polling transmission means comprises subscription polling control means for controlling transmission interval of said subscription polling so as the probability of success of response of a slave station for said subscription polling becomes large.

5. The multiple access system of claim 4, wherein said subscription polling control means comprises:

means for measuring the probability of success representing that polling resume request transmitted from a slave station responding to said subscription polling is normally received;
 means for measuring the probability of conflict representing that a plurality of polling resume requests transmitted from slave stations for said subscription polling conflict each other;
 means for calculating a traffic amount by adding said probability of success to doubled said probability of conflict;
 means for reducing average number of said subscription polling when said probability of success is not more than a first threshold value and said traffic amount is not more than a second threshold value; and
 means for increasing average number of said subscription polling when said probability of success is not more than said first threshold value and said traffic amount is not less than a third threshold value.

6. A multiple access system having a master station, at least one slave station, a broadcasting channel for transmitting a signal from said master station to said slave station and a multiple access channel for broadcasting a signal from said slave channel to said master station in which said master station communicates with said slave station based on a polling system, said master station comprises:

polling stop means for stopping polling for a slave station that has requested to stop polling;
 subscription polling transmission means for transmitting broadcasting type subscription polling; and
 polling resume means for resuming polling for a slave station that has responded to said subscription polling; and said slave station comprises:
  polling stop request means for requesting said master station to stop polling; and
  polling request means for requesting polling resume request to said master station, responding to said subscription polling.

7. The multiple access system of claim 6, wherein said slave station further comprises means for determining subscription polling for response based on random numbers when response signal conflict occurs due to a plurality of slave station's simultaneous response to subscription polling.

8. The multiple access system of claim 6, where a data transmission type between said master station and said slave station is of connection type, wherein said polling stop request means comprises means for requesting to stop polling for said master station when number of connection has become zero.

9. The multiple access system of claim 6, wherein said subscription polling transmission means comprises subscription polling control means for controlling transmission interval of said subscription polling so as the probability of success of response of a slave station for said subscription polling becomes large.

10. The multiple access system of claim 9, wherein said subscription polling control means comprises:

means for measuring the probability of success representing that polling resume request transmitted from a slave station for said subscription polling is normally received;
 means for measuring the probability of conflict representing that a plurality of polling resume requests transmitted from slave stations for said subscription polling conflict each other;
 means for calculating a traffic amount by adding said probability of success to doubled said probability of conflict;
 means for reducing average number of said subscription polling when said probability of success is not more than a first threshold value and said traffic amount is not more than a second threshold value; and
 means for increasing average number of said subscription polling when said probability of success is not more than a first threshold value and said traffic amount is not less than a third threshold value.

11. A method for multiple access in a multiple access system conducting communication between a master station and at least one slave station, said method comprising:

a polling stop step of, where said master station detects whether each slave station communicates, stopping polling for a slave station when said slave station does not communicate;
 a subscription polling transmission step of transmitting broadcasting type subscription polling by said master station;
 a polling request step of transmitting polling resume request to said master station by said slave station that has been stopped polling, responding to said subscription polling; and a polling resume step of resuming polling for a slave station that has responded to said subscription polling by said master station.

12. The method for multiple access of claim 11, wherein said polling request step comprises step of determining subscription polling for response based on random numbers when a response signal conflict occurs due to a plurality of slave station's simultaneous response to subscription polling.

13. The method for multiple access of claim 11, where a data transmission type between said master station and said slave station is of connectionless type, wherein said polling stop step comprises:

a step of monitoring request band width of said slave station; and a step of stopping polling for a slave station of which request band width is zero in a certain period.

14. The method for multiple access of claim 11, wherein said subscription polling transmission step comprises subscription polling control stop of controlling transmission interval of said subscription polling so as the probability of success of response of a slave station for said subscription polling becomes large.

15. The method for multiple access of claim 14, wherein said subscription polling control step comprises:

a step of measuring the probability of success representing that polling resume request for said subscription polling is normally received;

a step of measuring the probability of conflict representing that polling resume requests for said subscription polling conflict each other;

a step of calculating a traffic amount by adding said probability of success to doubled said probability of conflict;

a step of reducing average number of said subscription polling when said probability of success is not more than a first threshold value and said traffic amount is not more than a second threshold value; and a step of increasing average number of said subscription polling when said probability of success is not more than said first threshold value and said traffic amount is not less than a third threshold value.

16. A method for multiple access in a multiple access system conducting communication between a master station and at least one slave station, said method comprising:

a polling stop request step of transmitting polling stop request to said master station by said slave station;

a polling stop step of stopping polling for a slave station to which said master station has requested polling stop;

a subscription polling transmission step of transmitting broadcasting type subscription polling by said master station;

a polling request step of transmitting polling resume request to said master station by said slave station, responding to said subscription polling; and a polling resume step of resuming polling for a slave station that has responded to said subscription polling.

17. The method for multiple access of claim 16, wherein said polling request step comprises a step of determining subscription polling for response based on random numbers when a response signal conflict occurs due to a plurality of slave station's simultaneous response to subscription polling.

18. The method for multiple access of claim 16, where a data transmission type between said master station and said slave station is of connection type, wherein said polling stop request step comprises a step of requesting to stop polling for said master station when number of connection has become zero.

19. The method for multiple access of claim 16, wherein said subscription polling transmission step comprises a subscription polling control step of controlling transmission interval of said subscription polling so as the probability of success of response of a slave station for said subscription polling becomes large.

20. The method for multiple access of claim 19, wherein said subscription polling control step comprises:

a step of measuring the probability of success representing that polling resume request for said subscription polling is normally received;

a step of measuring the probability of conflict representing that a plurality of polling resume requests for said subscription polling conflict each other;

a step of calculating a traffic amount by adding said probability of success to doubled said probability of conflict;

a step of reducing average number of said subscription polling when said probability of success is not more than a first threshold value and said traffic amount is not more than a second threshold value; and a step of increasing average number of said subscription polling when said probability of success is not more than said first threshold value and said traffic amount is not less than a third threshold value.

* * * * *